(12) United States Patent
Urano et al.

(10) Patent No.: US 10,094,323 B2
(45) Date of Patent: Oct. 9, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Shigeyuki Urano, Gotenba (JP); Masanori Hayashi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/496,184

(22) Filed: Apr. 25, 2017

(65) Prior Publication Data

US 2017/0314499 A1    Nov. 2, 2017

(30) Foreign Application Priority Data

Apr. 27, 2016 (JP) .................. 2016-089760

(51) Int. Cl.
| | |
|---|---|
| *F02D 41/40* | (2006.01) |
| *F02D 41/24* | (2006.01) |
| *F02D 41/14* | (2006.01) |
| *F02D 41/38* | (2006.01) |

(52) U.S. Cl.
CPC ....... *F02D 41/402* (2013.01); *F02D 41/1475* (2013.01); *F02D 41/248* (2013.01); *F02D 41/2461* (2013.01); *F02D 2041/389* (2013.01); *F02D 2200/02* (2013.01); *F02D 2200/1002* (2013.01)

(58) Field of Classification Search
CPC .. F02D 41/402; F02D 41/2461; F02D 41/248; F02D 41/1475; F02D 2200/02; F02D 2200/1002; F02D 2041/389
See application file for complete search history.

(56) References Cited

U.S. PATENT DOCUMENTS

2016/0290307 A1*   10/2016   Urano .................... F02P 5/045

FOREIGN PATENT DOCUMENTS

| JP | H02-3769 A | 1/1990 |
|---|---|---|
| JP | H03-88919 A | 4/1991 |
| JP | 2007-154826 A | 6/2007 |
| JP | 2015-094339 A | 5/2015 |

* cited by examiner

*Primary Examiner* — Hung Q Nguyen
*Assistant Examiner* — Xiao Mo
(74) *Attorney, Agent, or Firm* — Hunton Andrews Kurth LLP

(57) ABSTRACT

A control apparatus for an internal combustion engine is configured, during a slightly stratified-charge lean-burn operation, to: calculate a basic total fuel injection amount based on a required torque; calculate a compression stroke injection amount based on an ignition delay index value; calculate, as a basic main injection amount, a value obtained by subtracting a compression stroke injection amount from the basic total fuel injection amount; calculate, based on an output value of an in-cylinder pressure sensor, an actual specified combustion index value that represents a main combustion speed or a combustion fluctuation rate; calculate a main injection correction term based on a result of a comparison between a target specified combustion index value or a tolerable specified combustion index value, and the actual specified combustion index value; and calculate a main injection amount by adding the main injection correction term to the basic main injection amount.

9 Claims, 16 Drawing Sheets

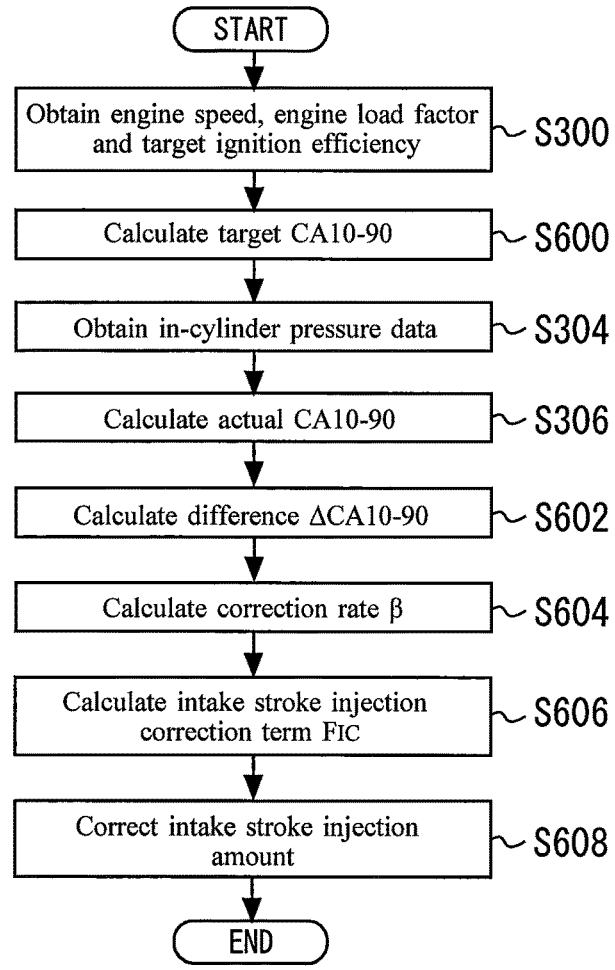
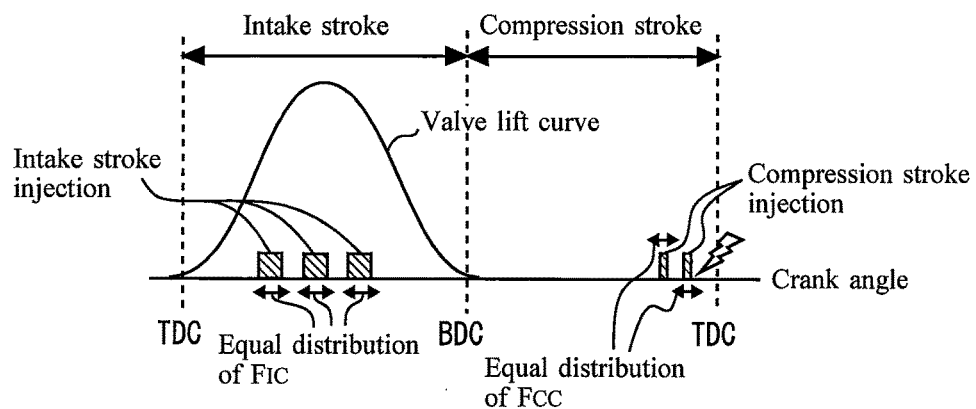

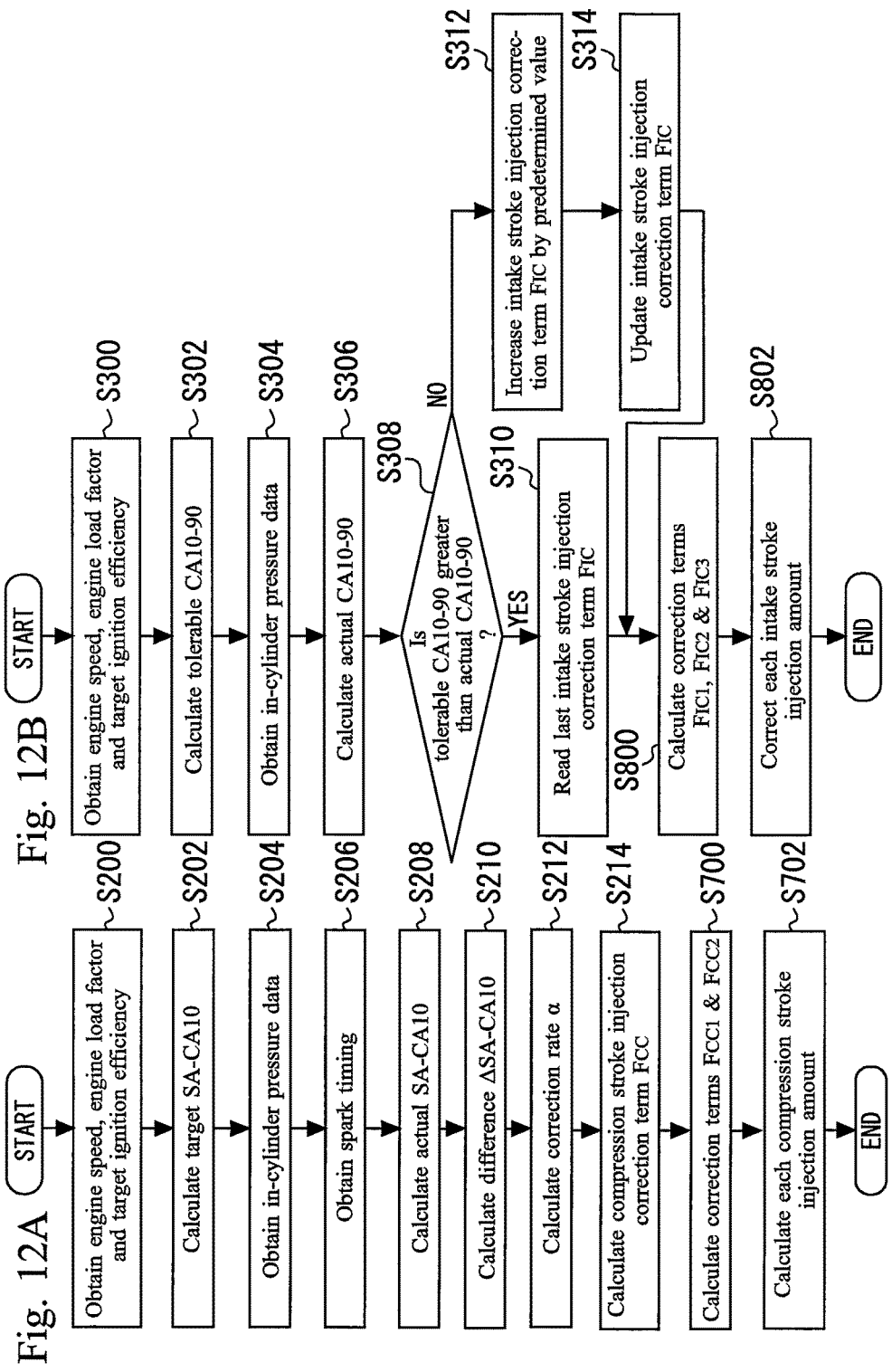

CONTROL APPARATUS FOR INTERNAL COMBUSTION ENGINE

CROSS-REFERENCE TO RELATED APPLICATION

This application is based on and claims the benefit of Japanese Patent Application No. 2016-089760, filed on Apr. 27, 2016, which is incorporated by reference herein in its entirety.

BACKGROUND

Technical Field

The present disclosure relates to a control apparatus for an internal combustion engine.

Background Art

JP 2015-094339A, for example, discloses a control apparatus for an internal combustion engine that includes an in-cylinder pressure sensor. In this control apparatus, feedback control for fuel injection amount with output values of the in-cylinder pressure sensor is executed in such a manner that an actual crank angle interval from a spark timing to a crank angle having a certain mass fraction of burned fuel approaches a target crank angle interval. In addition, in this control apparatus, feedback control for the spark timing with outputs values of the in-cylinder pressure sensor is executed in such a manner that an actual combustion center approaches a target combustion center.

JP 2007-154826A, for example, discloses an internal combustion engine that performs a stratified charge combustion operation, a homogeneous combustion operation and a slightly stratified charge combustion operation (in particular, a slightly stratified-charge lean-burn operation). At the time of the stratified charge combustion operation, in order to form an air-fuel mixture (a stratified mixture) with a relatively smaller (richer) air-fuel ratio around a spark plug during sparking, an fuel injection is executed in the compression stroke (basically, the latter half of the compression stroke) using an in-cylinder injection valve that directly injects fuel into a cylinder. At the time of the homogeneous charge combustion operation, in order to form a homogeneous mixture throughout the whole area in the cylinder, a fuel injection is executed in the intake stroke using a port injection valve that injects fuel into an intake port. At the time of the slightly stratified charge combustion operation, the aforementioned fuel injections in the compression stroke and the intake stroke are respectively executed using the in-cylinder injection valve and the port injection valve. According to the slightly stratified charge combustion operation, the difference of the air-fuel ratios between a stratified mixture zone located around the spark plug during sparking and a mixture zone in its vicinity decreases. In addition, the slightly stratified-charge lean-burn operation is achieved by performing the slightly stratified charge combustion operation with controlling the amount of each of the aforementioned fuel injections in such a manner that the air-fuel ratio with respect to a total fuel injection amount injected in one combustion cycle approaches an air-fuel ratio greater (leaner) than the stoichiometric air-fuel ratio.

In addition to JP 2015-094339A, JP 2007-154826A, JP H02-003769A and JP H03-088919A are patent documents which may be related to the present disclosure.

SUMMARY

In the present specification, as with JP 2007-154826A, a lean burn operation that is performed with combination of a fuel injection for forming a homogeneous mixture and a fuel injection for forming a stratified mixture is referred to as a "slightly stratified-charge lean-burn operation". The fuel injection for forming a homogeneous mixture is required to be performed during the intake stroke or before the intake stroke. Therefore, instead of using the manner described in JP 2007-154826A, the fuel injection may be performed in the intake stroke using an in-cylinder injection valve, or may be performed in the exhaust stroke immediately before the intake stroke using a port injection valve. In the present specification, a fuel injection executed in or before the intake stroke for forming the homogeneous mixture is referred to as a "main injection". In addition, a fuel injection performed in the compression stroke for forming the stratified mixture is referred to as a "compression stroke injection".

When a plurality of fuel injections are performed in each combustion cycle at the time of the slightly stratified-charge lean-burn operation, the influence of a fuel injection on combustion differs depending on a fuel injection timing. Specifically, the compression stroke injection that is relatively closer to the spark timing is easy to change the local air-fuel ratio of the air-fuel mixture located around the spark plug during sparking. On the other hand, the main injection that is relatively distant from the spark timing is easy to change the overall air-fuel ratio in a cylinder. Taking this into consideration, there is a concern described below when the feedback control for the fuel injection amount described in JP 2015-094339A is applied to the slightly stratified-charge lean-burn operation with the following manner.

That is, if a correction to make the actual crank angle interval approach the target crank angle interval is caused to be reflected in both of the fuel amount by the main injection and the fuel amount by the compression stroke injection, it may become difficult to perform an appropriate combustion control with taking into consideration the characteristics of the respective fuel injections described above. For example, if the fuel injection amount for forming the stratified mixture (that is, the amount of fuel by the compression stroke injection) is appropriate and the fuel injection amount for forming the homogeneous mixture (that is, the amount of fuel by the main injection) is small, there is a possibility that, since the aforementioned actual crank angle interval that represents an ignition delay period is appropriate, the correction of the fuel injection amount by this feedback control may not be performed. As a result, the fuel injection amount for forming the homogeneous mixture may be small continuously and the fluctuation of combustion may be deteriorated. Since the deterioration of the fluctuation of combustion leads to the fluctuation of engine torque, the drivability of the internal combustion engine may decrease.

The present disclosure has been made to address the problem described above, and an object of the present disclosure is to provide a control apparatus for an internal combustion engine that, when a slightly stratified-charge lean-burn operation is performed with a main injection executed in or before the intake stroke and a compression stroke injection, can improve the controllability of combustion with taking into consideration the influences of the respective injections on the combustion.

A control apparatus for controlling an internal combustion engine according to the present disclosure is configured to control an internal combustion engine that includes: an ignition device configured to ignite an air-fuel mixture in a cylinder; a fuel injection device that includes at least an in-cylinder injection valve configured to directly inject fuel into the cylinder; and an in-cylinder pressure sensor configured to detect in-cylinder pressure. The control apparatus is configured to cause the fuel injection device to execute a main injection of fuel in or before an intake stroke and a compression stroke injection of the fuel in a compression stroke to perform a slightly stratified-charge lean-burn operation with a lean air-fuel ratio leaner than a stoichiometric air-fuel ratio. The control apparatus is configured, during the slightly stratified-charge lean-burn operation, to: (a) calculate, based on a required torque of the internal combustion engine, a basic total fuel injection amount that should be supplied in a cylinder during one combustion cycle; (b) calculate, based on an ignition delay index value, a compression stroke injection amount by the compression stroke injection; (c) calculate, as a basic main injection amount of the main injection, a value obtained by subtracting the compression stroke injection amount from the basic total fuel injection amount; calculate, based on an output value of the in-cylinder pressure sensor, an actual specified combustion index value of a specified combustion index value that represents a main combustion speed or a combustion fluctuation rate; calculate a main injection correction term based on a result of a comparison between a target specified combustion index value or a tolerable specified combustion index value, and the actual specified combustion index value; and (f) calculate a main injection amount by the main injection by adding the main injection correction term to the basic main injection amount.

The control apparatus may be configured to: calculate the main injection correction term based on a result of a comparison between the tolerable specified combustion index value and the actual specified combustion index value; and calculate, as the main injection correction term, a value for increasing the main injection amount when a main combustion speed represented by the actual specified combustion index value is lower than a main combustion speed represented by the tolerable specified combustion index value or when a combustion fluctuation rate represented by the actual specified combustion index value is higher than a combustion fluctuation rate represented by the tolerable specified combustion index value.

The control apparatus may be configured to: (i) calculates the main injection correction term based on a result of a comparison between the target specified combustion index value and the actual specified combustion index value; and (j) correct the main injection amount by adding, to the basic main injection amount, the main injection correction term for causing the actual specified combustion index value to approach the target specified combustion index value.

The control apparatus may be configured to: (k) calculate, based on a target ignition delay index value, a basic compression stroke injection amount of the compression stroke injection; (l) calculate an actual ignition delay index value based on an output value of the in-cylinder pressure sensor; and (m) calculate a compression injection correction term for causing the actual ignition delay index value to approach the target ignition delay index value and correct the compression stroke injection amount by adding the compression stroke injection correction term to the basic compression stroke injection amount.

The control apparatus may be configured to: (i) calculates the main injection correction term based on a result of a comparison between the target specified combustion index value and the actual specified combustion index value; (j) correct the main injection amount by adding, to the basic main injection amount, the main injection correction term for causing the actual specified combustion index value to approach the target specified combustion index value; (k) calculate, based on a target ignition delay index value, a basic compression stroke injection amount of the compression stroke injection; (l) calculate an actual ignition delay index value based on an output value of the in-cylinder pressure sensor; (m) calculate a compression injection correction term for causing the actual ignition delay index value to approach the target ignition delay index value and correct the compression stroke injection amount by adding the compression stroke injection correction term to the basic compression stroke injection amount; and (n) increase a response speed of adjustment of the basic compression stroke injection amount with the compression stroke injection correction term compared to a response speed of adjustment of the basic main injection amount with the main injection correction term.

The control apparatus may be configured, if a plurality of compression stroke injections is executed during one combustion cycle, to apply the compression stroke injection correction term to a compression stroke injection executed at a most retard position.

The control apparatus may be configured, at a time of a transitional operation of the internal combustion engine, to correct the compression stroke injection amount by adding, to the basic compression stroke injection amount, a compression stroke injection increment value based on an engine load factor and a time change rate of the engine load factor instead of correcting the basic compression stroke injection amount with the compression stroke injection correction term.

The internal combustion engine may further include an air-fuel ratio sensor configured to detect an actual air-fuel ratio.

Where a correction rate $\alpha$ denotes a ratio of the compression stroke injection correction term to the basic compression stroke injection amount, a correction rate $\beta$ denotes a ratio of the main injection correction term to the basic main injection amount, a correction rate $\gamma$ denotes a ratio of a difference that is obtained by subtracting the actual air-fuel ratio from a target air-fuel ratio to the basic main injection amount, a compression stroke injection rate $KF_C$ denotes a ratio of the basic compression stroke injection amount to the basic total fuel injection amount, a main injection rate $KF_I$ denotes a ratio of the basic main injection amount to the basic total fuel injection amount, and a correction rate $\delta$, a correction rate $\gamma_C$ concerning the compression stroke injection and a correction rate $\gamma_I$ concerning the intake stroke injection respectively denote a calculation value $(KF_C \times \alpha + KF_I \times \beta - \gamma)$, a calculation value $(KF_C \times (KF_I \times (\alpha - \beta) + \gamma))$ and a calculation value $(KF_I \times (KF_C \times (\beta - \alpha) + \gamma))$ that are based on the correction rates $\alpha$, $\beta$, and $\gamma$, the compression stroke injection rate $KF_C$ and the main injection rate $KF_I$, the control apparatus may be configured to: (o) learn a $\delta$-learning map in which learned values $\delta_G$ of the correction rate $\delta$ are associated with a fuel injection amount correlation value and an intake air flow rate correlation value; (p) learn a $\gamma_C$-learning map in which learned values $\gamma_{CG}$ of the correction rate $\gamma_C$ concerning the compression stroke injection are associated with an engine torque correlation value and an engine speed correlation value; (q) learn a $\gamma_I$-learning map in which learned values $\gamma_{IG}$ of the correction rate $\gamma_I$ concerning the intake stroke injection are associated with the engine torque correlation value and the engine speed correlation value; (r) calculate a learning term of the compression stroke injection amount by multiplying the basic total fuel injection amount by a sum of the learned values $\gamma_{CG}$ and a calculation value $(KF_C \times \delta_G)$ that is a product of the compression stroke injection rate $KF_C$ and the learned values $\delta_G$, and correct the compression stroke injection amount by adding a calculated learning term of the compression stroke injection amount to the basic compression stroke injection amount; and (s) calculate a learning term of the main injection amount by multiplying the basic total fuel injection amount by a sum of the learned values $\gamma_{IG}$ and a calculation value $(KF_I \times \delta_G)$ that is a product of the main injection rate $KF_I$ and the learned values $\delta_G$, and correct the main injection amount by adding a calculated learning term of the main injection amount to the basic main injection amount.

The control apparatus may be configured, if a plurality of main injections is executed during one combustion cycle, to apply the main injection correction term to a main injection executed at a most advance position.

According to the control apparatus for an internal combustion engine of the present disclosure, during the slightly stratified-charge lean-burn operation, the compression stroke injection amount is controlled on the basis of the ignition delay index value. In the slightly stratified-charge lean-burn operation, the compression stroke injection for forming a stratified mixture has a greater impact on the ignitability of the air-fuel mixture compared to the main injection for forming a homogeneous mixture. According to the control of the compression stroke injection amount of the present disclosure, the control of the fuel injection amount for obtaining a proper ignitability (that is, a proper ignition delay) can be effectively performed for the compression stroke injection amount that has a greater impact on the ignitability. Further, according to the control apparatus of the present disclosure, the main injection amount is controlled on the specified combustion index value that represents a main combustion speed or a combustion fluctuation rate. The main combustion speed or the combustion fluctuation rate in the slightly stratified-charge lean burn is characterized by the homogenous mixture which occupies a great part of the space in the cylinder. According to the control of the main injection of the present disclosure, the control of the fuel injection amount for obtaining a proper main combustion speed and a proper combustion fluctuation rate can be effectively performed for the main injection amount that has a greater impact on the main combustion speed and the combustion fluctuation rate. According to the control apparatus of the present disclosure, when the slightly stratified-charge lean-burn operation is performed by combining the main injection executed in or before the intake stroke and the compression stroke injection, the controllability of the slightly stratified-charge lean burn can be improved taking into consideration the influences of the respective injections on the combustion.

BRIEF DESCRIPTION OF THE DRAWINGS

FIG. 10 is a flowchart that illustrates a subroutine of the processing concerning a CA10-90 feedback control;

FIG. 11 illustrates an example of a fuel injection operation executed at the time of the slightly stratified-charge lean-burn operation according to a fourth embodiment of the present disclosure;

FIGS. 12A and 12B are flowcharts that illustrate subroutines that are both combined with the main routine shown in FIG. 4 in the fourth embodiment of the present disclosure;

DETAILED DESCRIPTION

First Embodiment

Figure 1:
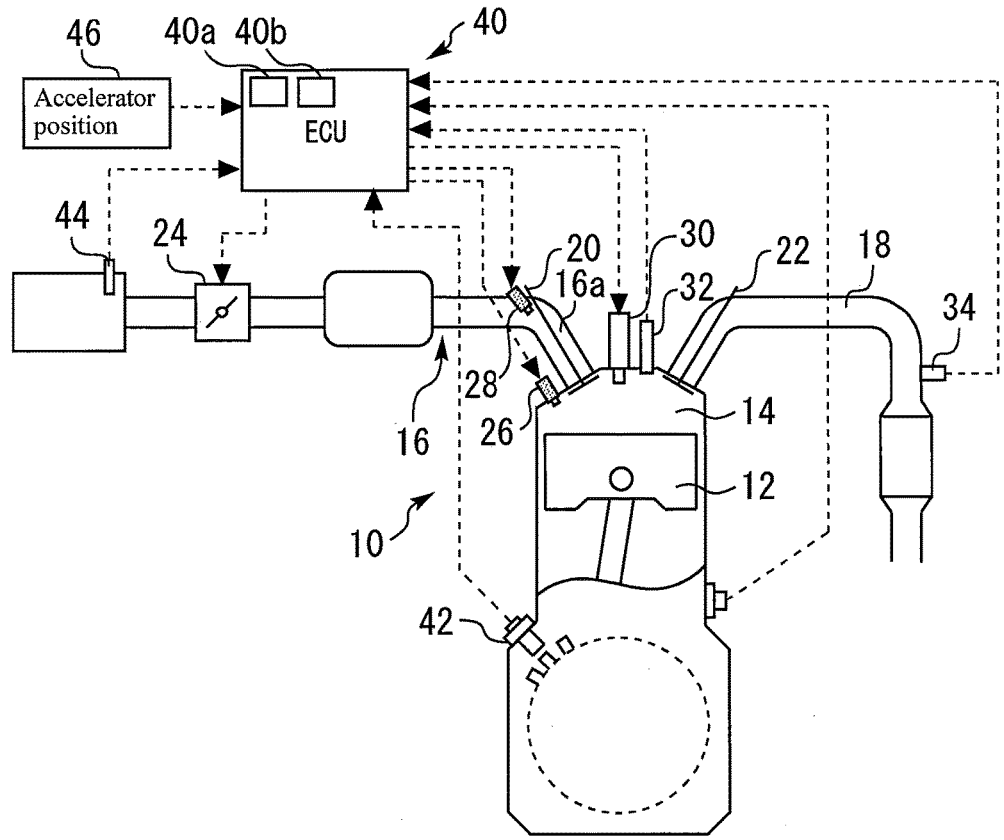
FIG. 1 is a view for describing a system configuration according to a first embodiment of the present disclosure.

Firstly, a first embodiment of the present disclosure will be described with reference to FIGS. 1 to 7.
[System Configuration of First Embodiment]
FIG. 1 is a view for describing a system configuration according to the first embodiment of the present disclosure. The system shown in FIG. 1 includes a spark-ignition type internal combustion engine (as an example, gasoline engine) 10. A piston 12 is provided in each cylinder of the internal combustion engine 10. A combustion chamber 14 is formed at the top side of the piston 12 inside the respective cylinders. An intake channel 16 and an exhaust channel 18 communicate with the combustion chamber 14.

An intake valve 20 is provided in an intake port 16a of the intake channel 16. The intake valve 20 opens and closes the intake port 16a. An exhaust valve 22 is provided in an exhaust port of the exhaust channel 18. The exhaust valve 22 opens and closes the exhaust port. An electronically controlled throttle valve 24 is provided in the intake channel 16. Also, the internal combustion engine 10 is provided with a fuel injection device for supplying fuel to each cylinder. The fuel injection device includes, for each cylinder, an in-cylinder injection valve 26 configured to directly inject fuel into the combustion chamber 14 (into the cylinder) and a port injection valve 28 configured to inject fuel into the intake port 16a. Further, each cylinder of the internal combustion engine 10 includes an ignition device (only a spark plug 30 is illustrated in FIG. 1) 28 configured to ignite an air-fuel mixture.

The internal combustion engine 10 includes an in-cylinder pressure sensor 32 configured to detect an in-cylinder pressure. As an example, the in-cylinder pressure sensor 32 is installed for each cylinder. In the exhaust channel 18, an air-fuel ratio sensor 34 configured to detect the air-fuel ratio of the gas discharged from the cylinders. Furthermore, the system according to the present embodiment includes a control apparatus for controlling the internal combustion engine 10. The control apparatus includes an electronic control unit (ECU) 40 and drive circuits (not shown in the drawings) for driving various actuators described below. The ECU 40 includes a memory 40a and a central processing unit (CPU) 40b.

The ECU 40 is configured to receive sensor signals from various sensors installed in the internal combustion engine 10 or the vehicle in which the internal combustion engine 10 is mounted. The various sensors include, in addition to the in-cylinder pressure sensor 32 and the air-fuel ratio sensor 34 that are described above, sensors for grasping the engine operating state, such as a crank angle sensor 42 that is arranged in the vicinity of a crankshaft (not illustrated in FIG. 1), and an air flow sensor 44 that is arranged in the vicinity of an inlet of the intake channel 16. An accelerator position sensor 46 configured to detect the depression amount of an accelerator pedal of the vehicle (that is, an accelerator position) is also electrically connected to the ECU 40. The ECU 40 processes the received sensor signals of each sensor and operates various actuators in accordance with predetermined control programs. The actuators operated by the ECU 40 include various actuators for controlling operation of the engine, such as the throttle valve 24, the in-cylinder injection valve 26, the port injection valve 28 and the ignition device that are described above.

[Control According to First Embodiment]
(Calculation of MFB and CAX Based on MFB)

Figure 2:
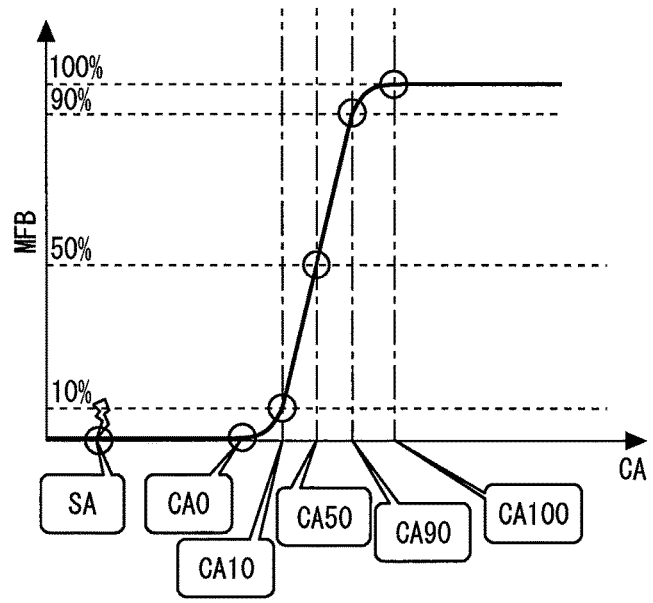
FIG. 2 is a view that represents a waveform of mass fraction of burned fuel (MFB) and a spark timing (SA)

FIG. 2 is a view that represents a waveform of mass fraction of burned fuel (MFB) and a spark timing (SA). According to the system of the present embodiment that includes the in-cylinder pressure sensor 32 and the crank angle sensor 42, in each cycle of the internal combustion engine 10, actual data of an in-cylinder pressure P can be acquired in synchrony with a crank angle (CA) (more specifically, a set of in-cylinder pressures P that are calculated as values associated with the respective predetermined crank angles). A heat release amount Q inside a cylinder at an arbitrary crank angle θ can be calculated according to the following equations (1) and (2) using the actual data of the in-cylinder pressure P and the first law of thermodynamics.

Furthermore, a mass fraction of burned fuel (hereunder, referred to as "MFB") at an arbitrary crank angle θ can be calculated in accordance with the following equation (3) using actual data of the heat release amount Q inside a cylinder (more specifically, a set of heat release amounts Q calculated as values for the respective predetermined crank angles), which is calculated using the actual data of the in-cylinder pressure P. Further, actual data of MFB (actual MFB set) that is synchronized with the crank angle can be calculated by executing processing to calculate the MFB at each predetermined crank angle. The actual data of MFB is calculated for a combustion period and for a predetermined crank angle period before and after the combustion period (here, as one example, the crank angle period is from a closing timing IVC of the intake valve 20 to an opening timing EVO of the exhaust valve 22).

$$\frac{dQ}{d\theta} = \frac{1}{\kappa - 1} \times \left( V \times \frac{dP}{d\theta} + P \times \kappa \times \frac{dV}{d\theta} \right) \tag{1}$$

$$Q = \sum \frac{dQ}{d\theta} \tag{2}$$

$$MFB = \frac{Q(\theta) - Q(\theta_{min})}{Q(\theta_{max}) - Q(\theta_{min})} \times 100 \tag{3}$$

Where, in the above equation (1), V represents an in-cylinder volume and κ represents a ratio of specific heat of in-cylinder gas. Further, in the above equation (3), $\theta_{min}$ denotes a combustion start point and $\theta_{max}$ denotes a combustion end point.

According to the actual data of MFB that is calculated by the above method, a crank angle at which MFB reaches a specified fraction X (%) (hereunder, referred to as "specified fraction combustion point", and indicated by attaching "CAX") can be calculated. Next, typical specified fraction combustion points CAX will now be described with reference to FIG. 2. Combustion in a cylinder starts with an ignition delay after an air-fuel mixture is ignited at the spark timing (SA). A start point of the combustion (θmin in the above described equation (3)), that is, a crank angle at which MFB starts to rise is referred to as "CA0". A crank angle period (CA0-CA10) from CA0 until a crank angle CA10 at which MFB reaches 10% corresponds to an initial combustion period, and a crank angle period (CA10-CA90) from CA10 until a crank angle CA90 at which MFB reaches 90% corresponds to a main combustion period. Further, according to the present embodiment, a crank angle CA50 at which MFB reaches 50% is used as a combustion center. A crank angle CA100 at which MFB reaches 100% corresponds to a combustion end point (θmax in the above described equation (3)) at which the heat release amount Q reaches a maximum value. The combustion period is defined as a crank angle period from CA0 to CA100.

(Lean Burn Operation and Stoichiometric Burn Operation)

The operating region of the internal combustion engine 10 can be determined on a two-dimensional surface based on the engine torque and the engine speed. In the present embodiment, the operating mode of the internal combustion engine 10 is switched between the stoichiometric burn operation and the lean burn operation in accordance with the operating region. The stoichiometric burn operation is performed while controlling the air-fuel ratio of the air-fuel mixture to the stoichiometric air-fuel ratio. On the other hand, the lean burn operation is performed while controlling the air-fuel ratio of the air-fuel mixture so as to be a lean air-fuel ratio greater than the stoichiometric air-fuel ratio.
(Slightly Stratified-Charge Lean-Burn Operation)

Figure 3:
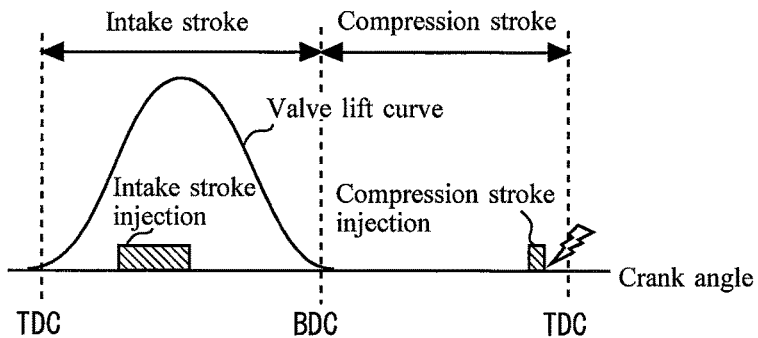
FIG. 3 is a view that illustrates an example of fuel injection at the time of the slightly stratified-charge lean-burn operation according to the first embodiment of the present disclosure.

More specifically, the lean burn operation according to the present embodiment is performed as a slightly stratified-charge lean-burn operation. FIG. 3 is a view that illustrates an example of fuel injection at the time of the slightly stratified-charge lean-burn operation according to the first embodiment of the present disclosure. At the time of the slightly stratified-charge lean-burn operation, a fuel injection operation to inject fuel with an amount needed to be supplied to a cylinder in one combustion cycle (hereunder, referred to as a "total fuel injection amount") is performed in a divided manner as follows. That is, a fuel injection at the intake stroke for forming a homogeneous mixture (hereunder, referred to as an "intake stroke injection") and a fuel injection at the compression stroke for forming a stratified mixture (hereunder, referred to as a "compression stroke injection") are executed as the fuel injection operation. When fuel injection is executed as just described, the difference between the air-fuel ratio around the spark plug 30 and the air-fuel ratio in its vicinity at the time of sparking becomes smaller than that at the time of the stratified charge combustion operation in which only the compression stroke injection is executed without the intake stroke injection. Thus, according to the slightly stratified-charge lean-burn operation, the degree of stratification of the air-fuel mixture located around the spark plug 30 at the time of sparking becomes lower than that at the time of the stratified-charge lean-burn operation being performed without the intake stroke injection under the same lean air-fuel ratio. Accordingly, in the present specification, a lean burn operation performed with the fuel injection operation described above is referred to as the "slightly stratified-charge lean-burn operation".

In addition, in the present embodiment, the intake stroke injection is executed using, for example, the port injection valve 28 during a period in which the intake valve 20 is open. However, the intake stroke injection may be executed using the in-cylinder injection valve 26. That is, the internal combustion engine 10 may include only the in-cylinder injection valve 26. Further, the fuel injection for forming the homogeneous mixture is not limited to the intake stroke injection, and may be executed using the port injection valve 28 instead, during the exhaust stroke immediately before the intake stroke. That is, the fuel injection for forming the homogenous mixture is required to be a fuel injection executed in or before the intake stroke (in the present specification, referred to as a "main injection").
(Features of Slightly Stratified-Charge Lean Burn)

Where, at the time of the slightly stratified-charge lean-burn operation, fuel injections are executed as the intake stroke injection for forming the homogeneous mixture and the compression stroke injection for forming the stratified mixture, the influences of the fuel injections on the slightly stratified-charge lean-burn operation differ depending on the injection timings. To be more specific, when the intake stroke injection and the compression stroke injection are combined, the compression stroke injection that is relatively closer to the spark timing is easy to change the local air-fuel ratio of the air-fuel mixture (stratified mixture) located around the spark plug 30 at the time of sparking. On the other hand, the intake stroke injection that is relatively distant from the spark timing is easy to change the overall air-fuel ratio of the air-fuel mixture (homogeneous mixture) in the cylinder.

In addition, the air-fuel ratio of the stratified mixture formed by the compression stroke injection has a greater impact on the ignitability of the air-fuel mixture at the slightly stratified-charge lean-burn operation, as compared to the air-fuel ratio of the homogeneous air-fuel ratio formed by the intake stroke injection. Further, a "main combustion speed" that is a combustion speed during the main combustion period is characterized by the homogenous mixture which occupies a great part of the space in the cylinder (which is formed by the intake stroke injection). Furthermore, in the slightly stratified-charge lean burn, the fluctuation of combustion and a torque fluctuation in association therewith are easy to increase and decrease due to the level of the main combustion speed. Thus, in order to keep a torque fluctuation rate to an allowable level at the time of the slightly stratified-charge lean-burn operation, it is important to properly control the main combustion speed.
(Outline of Control According to First Embodiment)

In view of the characteristics of the slightly stratified-charge lean-burn operation described above, in the present embodiment, the fuel injection amount by the compression stroke injection (hereunder, referred to as a "compression stroke injection amount") and the fuel injection amount by the intake stroke injection (hereunder, referred to as an "intake stroke injection amount") are controlled as follows in order to improve the controllability of combustion with taking into consideration the influence of each injection on the slightly stratified-charge lean burn.

In the present embodiment, the following two kinds of index values based on the output values of the in-cylinder pressure sensor 32 are used to control the fuel injection amount while grasping the combustion in the cylinder under the aforementioned object. That is, one of the index values is "SA-CA10" that corresponds to an example of ignition delay index values that represent an ignition delay of the air-fuel mixture. The SA-CA10 is a crank angle interval from the spark timing (SA) to 10% combustion point CA10 (more specifically, a difference that is obtained by subtracting the spark timing (SA) from CA10). Another of the index values is "CA10-90" described above. Specified combustion index values that represent the main combustion speed (or a combustion fluctuation rate described later) includes index values that represent the main combustion speed. In the present embodiment, the CA10-90 is used as an example of the index values that represent the main combustion speed.

In the present embodiment, the compression stroke injection amount is controlled on the basis of the SA-CA10 defined as described above, and the remaining intake stroke injection amount is controlled on the basis of the CA10-90. To be more specific, in the present embodiment, the following SA-CA10 feedback control is performed as an example of the control of the compression stroke injection amount based on the SA-CA10. Also, the following CA10-90 correction control is performed as an example of the control of the intake stroke injection amount based on the CA10-90.
(SA-CA10 Feedback Control)

A basic compression stroke injection amount $F_{CB}$ that is a basic value of the compression stroke injection amount is calculated as a value according to the engine operating condition (more specifically, engine speed and engine load) although the detail of the calculation thereof is described later as the processing of step S110. In addition, there is a correlation between the SA-CA10 and the air-fuel ratio. More specifically, in a lean air-fuel ratio range in which the air-fuel ratio is greater than the stoichiometric air-fuel ratio, there is a relation that the SA-CA10 increases as the air-fuel ratio is leaner. According to the SA-CA10 feedback control, the compression stroke injection amount is controlled so that an actual SA-CA10 that is a calculated value of SA-CA10 based on the output values of the in-cylinder pressure sensor 32 approaches a target SA-CA10. In more detail, according to the SA-CA10 feedback control, in a combustion cycle in which an actual SA-CA10 that is smaller than the target SA-CA10 is obtained (that is, in which an actual ignition delay period is shorter than a target ignition delay period), correction is executed to decrease the compression stroke injection amount to be used in the next cycle from the basic compression stroke injection amount $F_{CB}$ to thereby make the air-fuel ratio leaner and increase the actual SA-CA10. Conversely, in a cylinder in which an actual SA-CA10 that is greater than the target SA-CA10 is obtained (that is, in which an actual ignition delay period is longer than the target ignition delay period), correction is executed to increase the compression stroke injection amount to be used in the next cycle from the basic compression stroke injection amount $F_{CB}$ to thereby make the air-fuel ratio richer and decrease the actual SA-CA10.

(CA10-90 Correction Control)

A value obtained by subtracting a corrected compression stroke injection amount by the SA-CA10 feedback control from a basic total fuel injection amount $F_{ALLB}$ that is a basic value of the total fuel injection amount that should be supplied to the cylinder in one combustion cycle is calculated as a basis intake stroke injection amount $F_{IB}$ that is a basic value of the intake stroke injection. Besides the SA-CA10, the CA10-90 has a correlation with the air-fuel ratio. More specifically, in the lean air-fuel ratio range, there is a relation that the CA10-90 increases as the air-fuel ratio is leaner. When the CA10-90 increases under the same engine speed, the main combustion speed decreases. According to the CA10-90 correction control, it is determined whether or not an actual CA10-90 that is a calculation value of CA10-90 based on the output values of the in-cylinder pressure sensor 32 is smaller than a tolerable CA10-90 (that is, whether or not the main combustion speed is higher than a tolerable limit). As a result, the tolerable CA10-90 is smaller than or equal to the actual CA10-90 (that is, when the main combustion speed is lower than or equal to the tolerable limit), correction to increase the intake stroke injection amount from the basic intake stroke injection amount $F_{IB}$ is executed to increase the main combustion speed so as to be higher than the tolerable limit.

(Concrete Processing According to First Embodiment)

Figure 4:
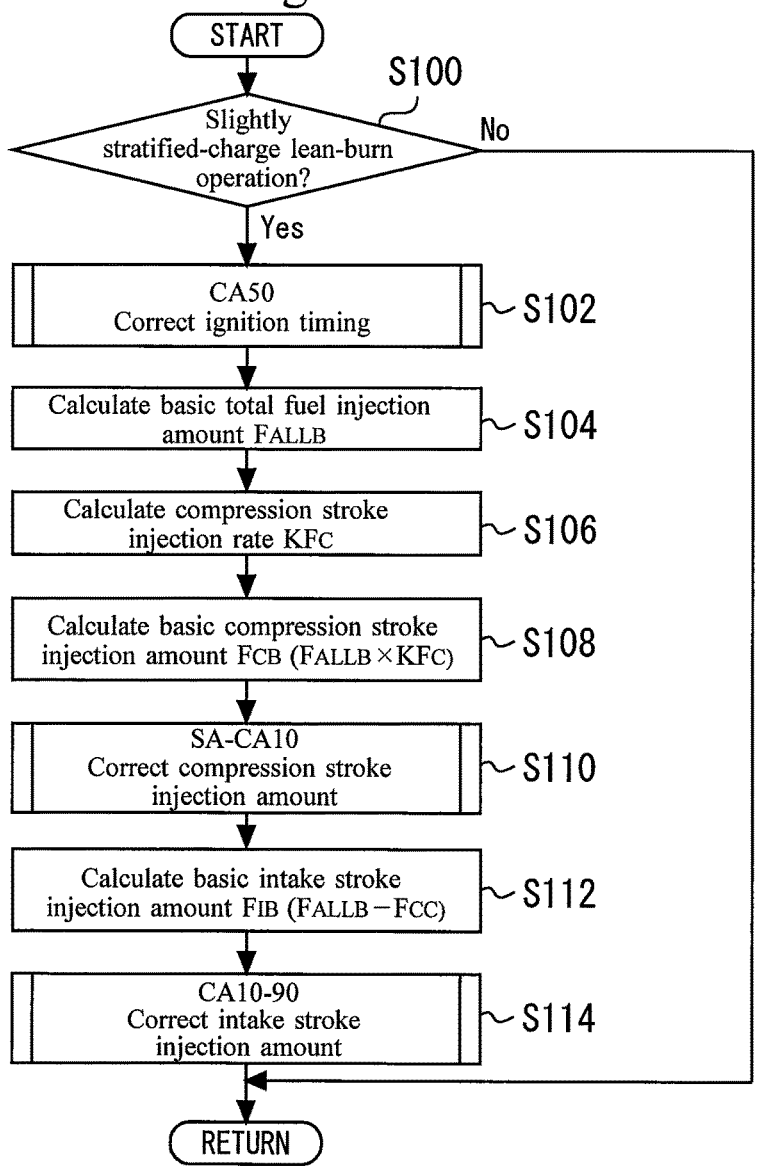
FIG. 4 is a flowchart that illustrates a main routine of the control performed at the time of the slightly stratified-charge lean-burn operation in the first embodiment of the present disclosure.

FIG. 4 is a flowchart that illustrates a main routine of the control performed at the time of the slightly stratified-charge lean-burn operation in the first embodiment of the present disclosure. In addition, the present routine is started when the opening timing of the exhaust valve 22 elapses in each cylinder (that is, when acquisition of the data of the in-cylinder pressure that is used as a basis of calculation of the actual data of MFB is completed) and repeatedly executed for every combustion cycle.

In the main routine shown in FIG. 4, first, the ECU 40 determines whether or not the internal combustion engine 10 is during the slightly stratified-charge lean-burn operation (step S100). This determination can be performed on the basis of, for example, whether or not the current operating region is an operating region in which the slightly stratified-charge lean-burn operation is performed.

If the ECU 40 determines in step S100 that the internal combustion engine 10 is during the slightly stratified-charge lean-burn operation, the ECU 40 executes the processing concerning a CA50 feedback control (step S102). According to the CA50 feedback control, the spark timing is adjusted so that an actual CA50 that is a calculation value of CA50 based on the output values of the in-cylinder pressure sensor 32 approaches a target CA50. Since the detail of this feedback control is described in, for example, JP 2015-094339 A, the detailed explanation thereof is herein omitted. When the compression stroke injection amount and the intake stroke injection amount are respectively adjusted by the SA-CA10 feedback control and the CA10-90 correction control described above, an optimum spark timing (MBT: Minimum advance for the Best Torque) changes in association with these injection amounts. If the CA50 feedback control is performed using the target CA50 that is a value of CA50 at which MBT is obtained, the aforementioned controls of the fuel injection amount (that is, the SA-CA10 feedback control and the CA10-90 correction control) can be performed with the spark timing approaching the MBT. Therefore, it is favorable to perform the CA50 feedback control in combination with the SA-CA10 feedback control and the CA10-90 correction control, although this CA50 feedback control is not necessarily combined with the SA-CA10 feedback control and the CA10-90 correction control.

Next, the ECU 40 calculates the basic total fuel injection amount $F_{ALLB}$ (step S104). The basic total fuel injection amount $F_{ALLB}$ is basically calculated so as to be a value according to a required torque of the internal combustion engine 10. The required torque is calculated so as to be a value according to the depression amount of the accelerator pedal detected by the accelerator position sensor 46.

Next, the ECU 40 calculates a compression stroke injection rate $KF_C$ (step S106). The compression stroke injection rate $KF_C$ is a value that indicates the ratio of a basic compression stroke injection amount $F_{CB}$ to the basic total fuel injection amount $F_{ALLB}$. The ECU 40 calculates the compression stroke injection rate $KF_C$ with, for example, the following method described with reference to FIG. 5, and then calculates, as the basic compression stroke injection amount $F_{CB}$, the product of the basic total fuel injection amount $F_{ALLB}$ and the compression stroke injection rate $KF_C$ (step S108).

Figure 5:
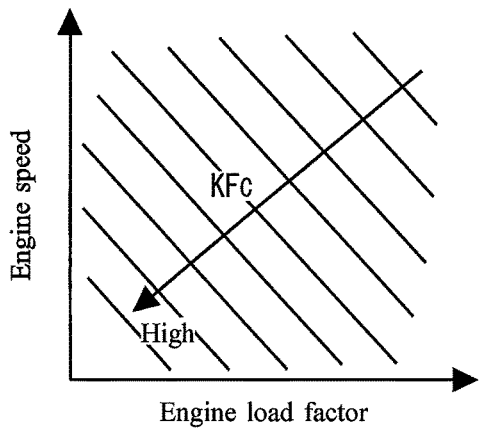
FIG. 5 is a graph for explaining an example of the setting of a map that defines a relation among a compression stroke injection rate $KF_C$, an engine load factor and an engine speed.

FIG. 5 is a graph for explaining an example of the setting of a map that defines a relation among the compression stroke injection rate $KF_C$, the engine load factor and the engine speed. As described above, the compression stroke injection is executed to form a rich stratified mixture zone located around the spark plug at the time of sparking. According to the processing of step S108, the basic compression stroke injection amount $F_{CB}$ is determined as a minimum necessary amount to form the stratified mixture zone having the air-fuel ratio that can ensure a stable ignition. If the SA-CA10 decreases, the ignition delay period becomes shorter and the ignition becomes more stable. Thus, from the perspective of the SA-CA10, the basic compression stroke injection amount $F_{CB}$ is determined so as to be a value according to a limit (maximum) SA-CA10 that can ensure a stable ignition. The limit SA-CA10 corresponds to the target SA-CA10 of the SA-CA10 feedback control.

In the map of the compression stroke injection rate $KF_C$ shown in FIG. 5, the compression stroke injection rate $KF_C$ according to the engine load factor and the engine speed is set so that the compression stroke injection rate $KF_C$ based on the above idea can be calculated in each operating region. More specifically, the value of the compression stroke injection amount that can secure a stable ignition (that is, the value of the basic compression stroke injection amount $F_{CB}$ according to the limit SA-CA10 described above) does not change so much even when the engine load factor changes. On the other hand, as the engine load factor is higher, the amount of air charged in a cylinder becomes greater, and the basic total fuel injection amount $F_{ALLB}$ thereby becomes greater. Accordingly, in the setting of the map shown in FIG. 5, as the engine load factor is lower, the compression stroke injection rate $KF_C$ (that is, the ratio of the basic compression stroke injection amount $F_{CB}$ to the basic total fuel injection amount $F_{ALLB}$) becomes higher.

In addition, when the engine speed decreases, the stability of combustion decreases. It is thus required to increase the basic compression stroke injection amount $F_{CB}$ as the engine speed is lower. Therefore, in the setting of the maps shown in FIG. 5, the compression stroke injection rate $KF_C$ becomes higher as the engine speed is lower.

After calculating the basic compression stroke injection amount $F_{CB}$ in step S108, the ECU 40 executes the processing concerning the SA-CA10 feedback control for determining the compression stroke injection amount (step S110).

Figure 6:
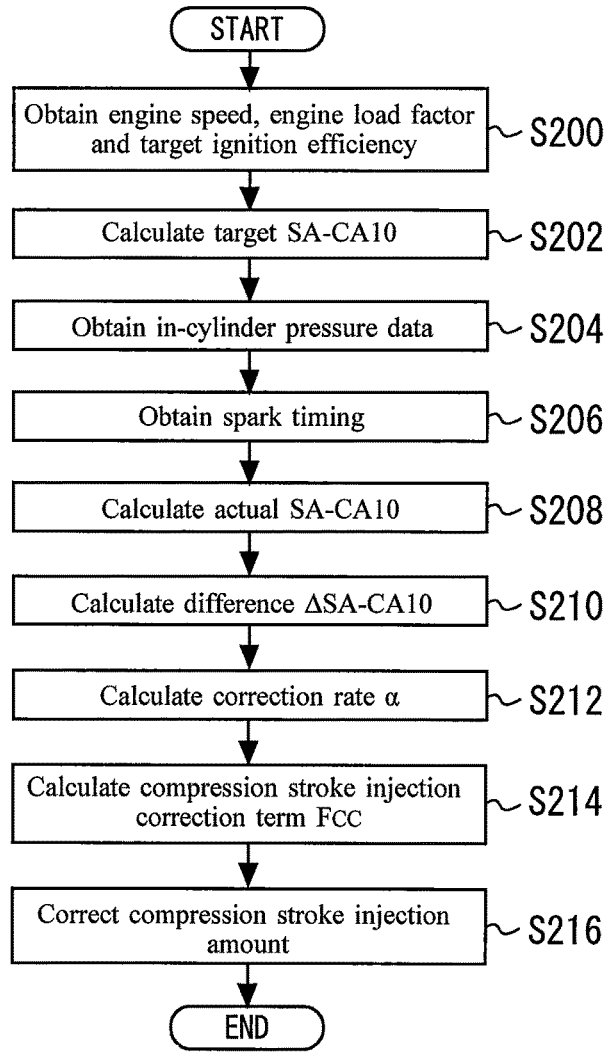
FIG. 6 is a flowchart that illustrates a subroutine of the processing concerning an SA-CA10 feedback control.

FIG. 6 is a flowchart that illustrates a subroutine of the processing concerning the SA-CA10 feedback control. In the subroutine shown in FIG. 6, the ECU 40 first obtains the engine speed, the engine load factor and a target ignition efficiently (step S200). The ignition efficiency is an index value concerning the efficiency of generating an engine torque with adjustment of the spark timing. The ignition efficiency has the value of 1 (peak value) at a CA50 that is obtained when the spark timing is controlled to MBT, and decreases when the CA50 is advanced or retarded with respect to this CA50 (at MBT) with adjustment of the spark timing. The target spark efficiency basically has the value of 1, and is corrected to a value that is less than 1 in order to, for example, retard the spark timing with respect to MBT under a specified condition, such as the time of gear shifting of the vehicle, the time of before and after a fuel cut operation, or the time of occurrence of knock.

Next, the ECU 40 calculates the target SA-CA10 (step S202). The ECU 40 stores a map (not shown in the drawings) that defines a relation among the target SA-CA10, the engine speed, the engine load factor and the target ignition efficiency. More specifically, in this map, each of the target SA-CA10 is set so as to be a value according to a target air-fuel ratio at each engine operating point in an operating region in which the slightly stratified-charge lean-burn operation is performed. The target air-fuel ratio corresponds to a target value of the air-fuel ratio of the overall air-fuel mixture in a cylinder. In addition, with the aforementioned map, the target SA-CA10 is set as a value corresponding to the limit SA-CA10 described above.

Next, with the output values of the in-cylinder pressure sensor 32, the ECU 40 obtains the in-cylinder pressure data associated with the crank angle (step S204). Then, the ECU 40 obtains the target spark timing (step S206). The target spark timing is a value that is obtained by adding the last correction amount for the spark timing by the CA50 feedback control described above to the basic spark timing according to the engine load factor and the engine speed.

Next, the ECU 40 calculates an actual SA-CA10 (step S208). The actual SA-CA10 is calculated as a crank angle interval from the target spark timing obtained in step S208 to the actual CA10 obtained with calculation based on the in-cylinder pressure data obtained in step S204. Then, the ECU 40 calculates a difference ΔSA-CA10 between the target SA-CA10 and the actual SA-CA10 that are obtained in steps S202 and 208, respectively (step S210).

Next, the ECU 40 calculates a correction rate α for the compression stroke injection amount based on the calculated difference ΔSA-CA10 and a predetermined PI gain (that is, proportional gain and integral gain) (step S212). That is, the correction rate α is calculated in accordance with the magnitudes of the difference ΔSA-CA10 and the integrated value thereof. The ECU 40 then calculates a correction term $F_{CC}$ for the compression stroke injection amount (hereafter, referred to as a "compression stroke injection correction term") by multiplying the basic compression stroke injection amount $F_{CB}$ (refer to step S108) by the correction rate α (%) calculated in step S212 (step S214). Further, the ECU 40 corrects the compression stroke injection amount by adding this compression stroke injection correction term $F_{CC}$ to the basic compression stroke injection amount $F_{CB}$ (step S216). In the present embodiment, the value calculated in step S216 is treated as a final compression stroke injection amount subject to the SA-CA10 feedback control.

In the main routine shown in FIG. 4, the ECU 40 calculates a basic intake stroke injection amount $F_{IB}$ following the processing of step S110 (step S112). In detail, the value obtained by subtracting the final (corrected) compression stroke injection amount calculated in step S216 from the basic total fuel injection amount $F_{ALLB}$ calculated in step S104 is calculated as the basic intake stroke injection amount $F_{IB}$.

Figure 7:
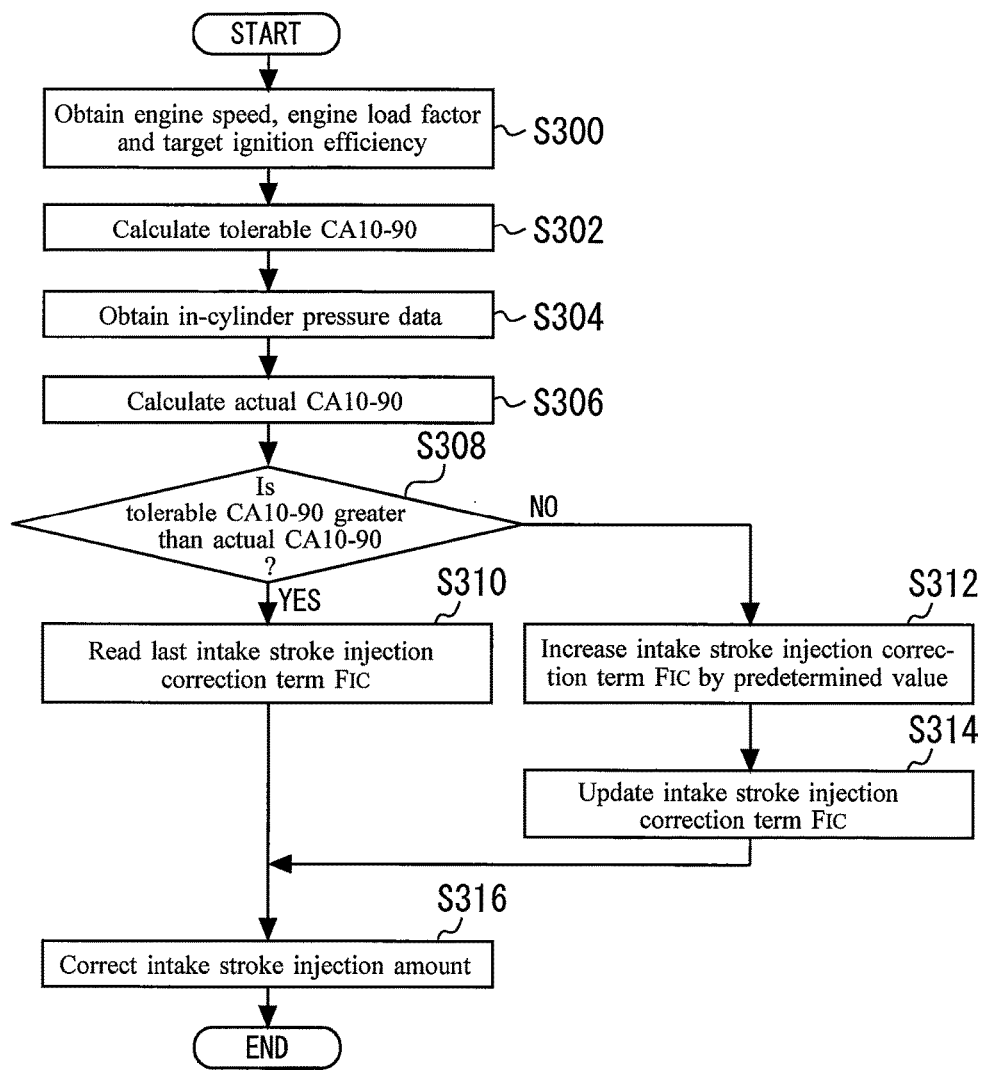
FIG. 7 is a flowchart that illustrates a subroutine of the processing concerning a CA10-90 correction control.

Next, the ECU 40 executes the processing concerning the CA10-90 correction control (step S114). FIG. 7 is a flowchart that illustrates a subroutine of the processing concerning the CA10-90 correction control. In the subroutine shown in FIG. 7, the ECU 40 first obtains the engine speed, the engine load factor and the target ignition efficiency (step S300). The ECU 40 then calculates the tolerable CA10-90 (step S302). The ECU 40 stores a map (not shown in the drawings) that defines the tolerable CA10-90 with using, as map axes, the engine speed, the engine load factor and the target ignition efficiency, for example. As already described, in the lean air-fuel ratio range on the leaner side relative to the stoichiometric air-fuel ratio, as the air-fuel ratio is leaner, the CA10-90 becomes larger (that is, the main combustion speed becomes lower) and the torque fluctuation rate becomes higher. The value of each tolerable CA10-90 in the map is set in advance as a value (threshold value) corresponding to a lower limit of the main combustion speed that enables the torque fluctuation rate to be reduced below a tolerable level from the viewpoint of the drivability of the internal combustion engine 10. In step S302, with reference to this kind of map, the tolerable CA10-90 according to the engine speed, the engine load factor and the target ignition efficiency is calculated. In more detail, the tolerable CA10-90 is set in the aforementioned map so as to be a value according to the target air-fuel ratio at each engine operation point in the operation region in which the slightly stratified-charge lean-burn operation is performed.

Next, the ECU 40 obtains the in-cylinder pressure data in the same manner as the processing of step S204 (step S304), and then calculates the actual CA10-90 on the basis of the actual data of MFB calculated based on the in-cylinder pressure data (step S306). Further, the ECU 40 determines whether or not the tolerable CA10-90 is greater than the actual CA10-90 (step S308).

When the determination result of step S308 is positive, that is, when it can be determined that the main combustion speed is higher than a tolerable value (the lower limit described above), the ECU 40 read a correction term $F_{IC}$ of the intake stroke injection amount used at the last cycle (hereafter, referred to as an "intake stroke injection correction term") (step S310). The ECU 40 is configured to use an arbitrary value as an initial value of the intake stroke injection correction term FTC and to store, in the memory 40a, the intake stroke injection correction term $F_{IC}$ that is updated in the following step S314. If an engine operation region (which is defined with the engine load factor and the engine speed, for example) for storing the intake stroke injection correction term $F_{IC}$ is divided into a predetermined number of parts, the intake stroke injection correction term $F_{IC}$ may be stored, for example, for each part of the engine operating region.

When, on the other hand, the determination result of step S308 is negative, that is, when it can be determined that the main combustion speed is lower than or equal to the tolerable value described above, the ECU 40 executes the processing to increase the intake stroke injection correction term $F_{IC}$ from the last value by a predetermined value (step S312). The ECU 40 then updates the intake stroke injection correction term $F_{IC}$ with a value obtained after the processing of step S312 (step S314). In addition, a configuration may be, for example, made such that the intake stroke injection correction term $F_{IC}$ stored in the memory 40a is cleared when an ignition switch of the vehicle is turned OFF, or is cleared when an electrical connection between a battery for supplying the electric power to the ECU 40 and the ECU 40 is shut.

The ECU 40 corrects the intake stroke injection amount by adding the intake stroke injection correction term $F_{IC}$ obtained by the processing of step S310 or step S314 to the basic intake stroke injection amount $F_{IB}$ (refer to step S112) (step S316). In the present embodiment, the value calculated in step S316 is treated as a final intake stroke injection amount subject to the CA10-90 correction control.

According to the control of the first embodiment described so far, the compression stroke injection amount is controlled on the basis of the SA-CA10. In more detail, the basic compression stroke injection amount $F_{CB}$ is calculated as a value corresponding to the limit SA-CA10 (equivalent to target SA-CA10) that is defined to ensure a stable ignitability, and the compression stroke injection amount is controlled so as to have a value that is obtained by adding the compression stroke injection correction term $F_{CC}$ by the SA-CA10 feedback control to this basic compression stroke injection amount $F_{CB}$. Thus, the actual SA-CA10 can be controlled so as to approach the target SA-CA10. As already described, in the slightly stratified-charge lean-burn operation, the compression stroke injection for forming the stratified mixture has a greater impact on the ignitability of the air-fuel mixture than the intake stroke injection for forming the homogeneous mixture. According to the control of the compression stroke injection amount of the present embodiment based on the SA-CA10, the control of the fuel injection amount for obtaining a proper ignitability can be effectively performed for the compression stroke injection amount that has a greater impact on the ignitability (in other words, can be performed more directly than an example in which the total fuel injection amount is used as a target of the SA-CA10 feedback control).

Moreover, according to the control of the first embodiment, the intake stroke injection amount is controlled on the basis of the CA10-90 correction control. In more detail, the basic intake stroke injection amount $F_{IB}$ is calculated by subtracting the compression stroke injection amount from the basic total fuel injection amount $F_{ALLB}$ according to the required torque, and the intake stroke injection amount is controlled so as to have a value that is obtained by adding the intake stroke injection correction term $F_{IC}$ by the CA10-90 correction control to this basic intake stroke injection amount $F_{IB}$. In the CA10-90 correction control, the intake stroke injection amount is increased when the tolerable CA10-90 is smaller than or equal to the actual CA10-90. Thus, the main combustion speed can be controlled so as not to fall below the tolerable value (the lower limit described above). As already described, the main combustion speed in the slightly stratified-charge lean-burn operation is characterized by the homogenous mixture which occupies a great part of the space in the cylinder (which is formed by the intake stroke injection). According to the control of the intake stroke injection amount of the present embodiment based on the CA10-90, the control of the fuel injection amount for obtaining a proper main combustion speed can be more effectively performed for the intake stroke injection amount that has a greater impact on the main combustion speed (in other words, more directly than an example in which the total fuel injection amount is used as a target of the CA10-90 correction control).

According to the control of the first embodiment, which has been described so far, when the slightly stratified-charge lean-burn operation is performed by combining the intake stroke injection and the compression stroke injection, the controllability of the slightly stratified-charge lean burn can be improved taking into consideration the influences of the respective injections on the combustion.

Furthermore, according to the control of the first embodiment, since the basic total fuel injection amount $F_{ALLB}$ is determined in accordance with the required torque, the acquisition of an engine torque that is equivalent to the required torque can be ensured. In addition, according to the control of the first embodiment, the actual SA-CA10 is controlled so as to approach the target SA-CA10 corresponding to the limit (maximum) SA-CA10 that can ensure an stable ignition. Thus, the compression stroke injection amount can be determined so as to be a minimum necessary amount for ensuring an stable ignition. The ratio of the intake stroke injection amount to the total fuel injection amount can therefore be increased. Consequently, forming a locally rich air-fuel mixture is prevented as much as possible while properly ensuring the ignitability. This can reduce generation of NOx. Additionally, since the main combustion speed can be properly ensured due to the fact that a sufficient intake stroke injection amount is obtained, the drivability of the internal combustion engine 10 can be favorably ensured.

In the first embodiment described above, if the tolerable CA10-90 is greater than the actual CA10-90 (that is, if the main combustion speed is high), the intake stroke injection correction term $F_{IC}$ is not corrected. Instead of this kind of processing, if, although the tolerable CA10-90 is greater than the actual CA10-90 (that is, although the main combustion speed is high), the difference that is obtained by subtracting the actual CA10-90 from the tolerable CA10-90 is greater than a predetermined value (that is, the main combustion speed is too high), correction to decrease the intake stroke injection correction term FTC as compared to the last value may be performed.

Second Embodiment

Next, a second embodiment of the present disclosure will be described with reference to FIG. 8. In the following explanation, it is assumed that the configuration shown in FIG. 1 is used as an example of the configuration of a system according to the second embodiment. This also applies to third to eighth embodiments described later.
[Control According to Second Embodiment]

The control according to the present embodiment is different from the control according to the first embodiment described above in terms of the calculation method of the compression stroke injection amount based on the SA- CA10. To be more specific, in the first embodiment, the value that is obtained by adding, to the basic compression stroke injection amount $F_{CB}$, the compression stroke injection correction term $F_{CC}$ by the SA-CA10 feedback control is calculated as a final compression stroke injection amount. In contrast, in the present embodiment, the basic compression stroke injection amount $F_{CB}$ is obtained as a final compression stroke injection amount without the SA-CA10 feedback control. In addition, the manner of calculating the basic compression stroke injection amount $F_{CB}$ is the same as that for the first embodiment.

(Concrete Processing According to Second Embodiment)

Figure 8:
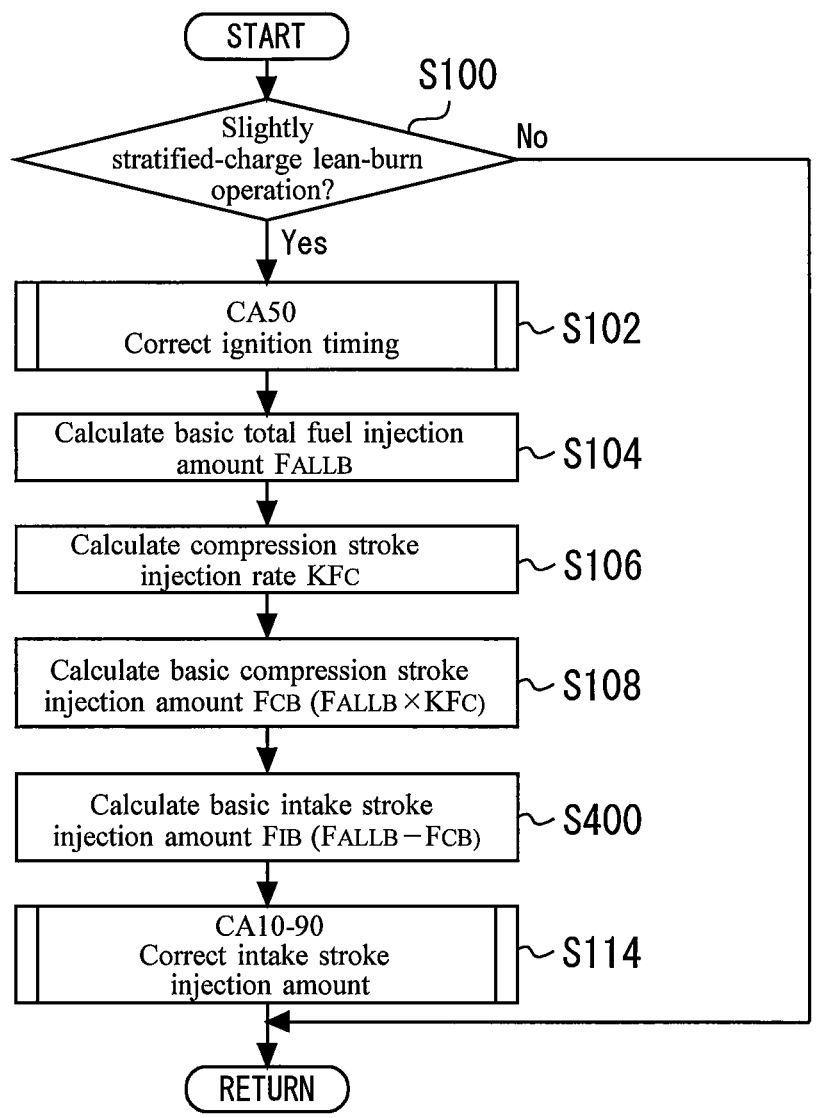
FIG. 8 is a flowchart that illustrates a main routine of the control performed in a second embodiment of the present disclosure.

FIG. 8 is a flowchart that illustrates a main routine of the control performed in the second embodiment of the present disclosure. The processing of steps S100 to S108 and S114 in the main routine shown in FIG. 8 is as already described in the first embodiment. In the present routine, the ECU 40 proceeds to step S400 after calculating the basic compression stroke injection amount $F_{CB}$ on the basis of the limit SA-CA10 (equivalent to the target SA-CA10) in step S108.

In step S400, the basic intake stroke injection amount $F_{IB}$ is calculated as a value that is obtained by subtracting the basic compression stroke injection amount $F_{CB}$ calculated in step S108 from the basic total fuel injection amount $F_{ALLB}$ calculated in step S104. As described above, in the present embodiment, the manner of calculating the final compression stroke injection amount is different from that for the first embodiment, and the manner of calculating the basic intake stroke injection amount $F_{IB}$ is also different therefrom accordingly. In step S114, the processing concerning the CA10-90 correction control is performed using the basic intake stroke injection amount $F_{IB}$ calculated in step S400.

According to the control of the second embodiment described so far, as with that of the first embodiment, the compression stroke injection amount is controlled (determined) on the basis of the SA-CA10 and the intake stroke injection amount is controlled on the basis of the CA10-90. Thus, according to the control of the second embodiment, when the slightly stratified-charge lean-burn operation is performed with a combination of the intake stroke injection and the compression stroke injection, the controllability of the slightly stratified-charge lean-burn operation can also be improved taking into consideration the influences of the respective injections on the combustion. In addition, in the present embodiment, since the SA-CA10 feedback control is not used, the configuration of the control can be simplified and the load of the processing by the ECU 40 can also be reduced.

The control of the compression stroke injection amount based on the SA-CA10 according to the second embodiment described above (that is, the control that uses the basic compression stroke injection amount $F_{CB}$ based on the SA-CA10 as the final compression stroke injection amount) may be combined with a CA10-90 feedback control described in the following third embodiment.

Third Embodiment

Next, a third embodiment of the present disclosure will be described with reference to FIGS. 9 and 10.

Control According to Third Embodiment

The control according to the present embodiment is different from the control according to the first embodiment descried above in terms of the manner of controlling the intake stroke injection amount based on the CA10-90. More specifically, in the present embodiment, the CA10-90 feedback control described below is performed instead of a CA10-90 correction control described above.

(CA10-90 Feedback Control)

According to the CA10-90 feedback control, the intake stroke injection amount is controlled so that the actual CA10-90 based on the output values of the in-cylinder pressure sensor 32 approaches a target CA10-90. To be more specific, according to the CA10-90 feedback control, for a combustion cycle in which the actual CA10-90 that is smaller than the target CA10-90 is obtained (that is, in which the actual main combustion speed is higher than a target main combustion speed), correction to decrease, from the basic intake stroke injection amount, the intake stroke injection amount used at the next cycle is performed in order to make lean the air-fuel ratio to increase the actual CA10-90. In contrast to this, for a combustion cycle in which the actual CA10-90 that is greater than the target CA10-90 is obtained (that is, in which the actual main combustion speed is lower than a target main combustion speed), correction to increase, from the basic intake stroke injection amount, the intake stroke injection amount used at the next cycle is performed in order to make rich the air-fuel ratio to decrease the actual CA10-90.

(Setting of Response Speed of Feedback Control)

In the present embodiment, as feedback controls for the fuel injection amount, the SA-CA10 feedback control and the CA10-90 feedback control are performed during the slightly stratified-charge lean-burn operation. Accordingly, in the present embodiment, the response speed of adjustment of the compression stroke injection amount (for forming the stratified mixture) by the SA-CA10 feedback control is increased as compared to the response speed of adjustment of the intake stroke injection amount (for forming the homogeneous mixture) by the CA10-90 feedback control.

(Concrete Processing According to Third Embodiment)

Figure 9:
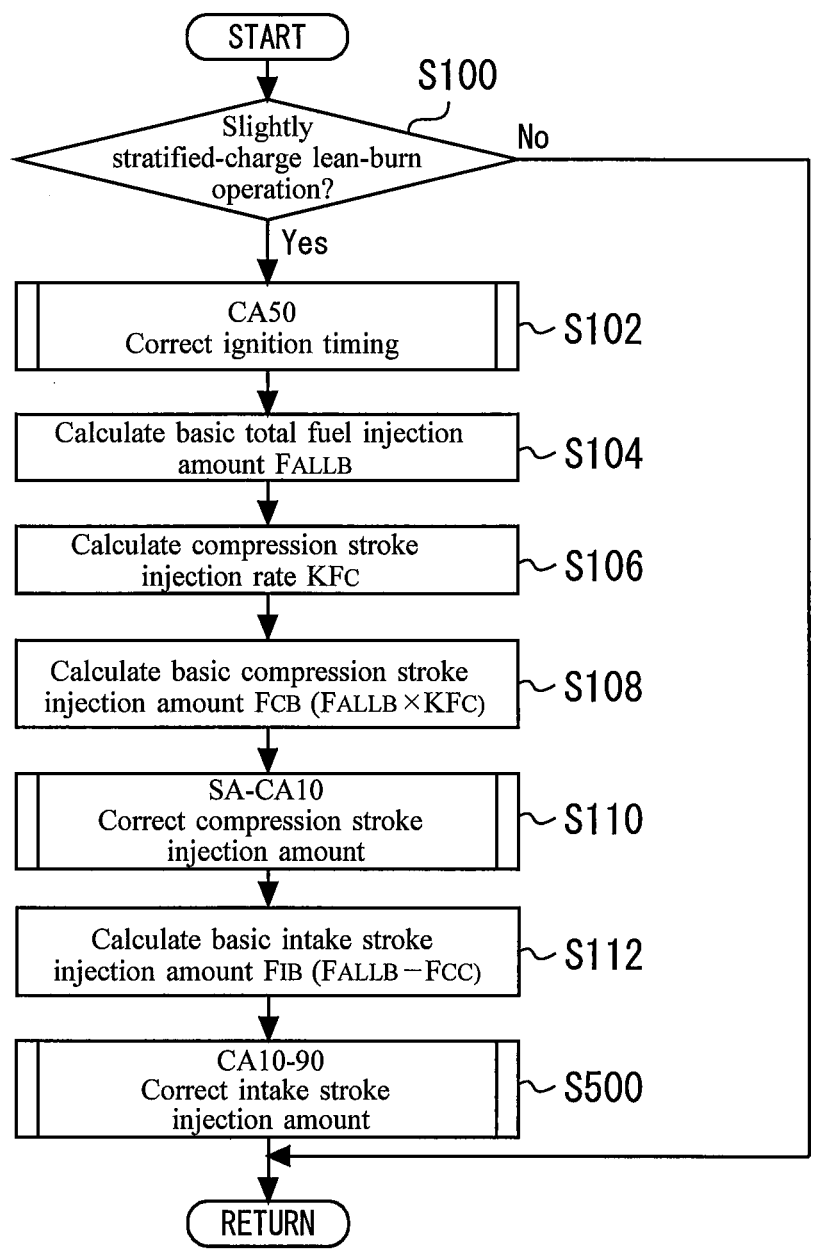
FIG. 9 is a flowchart that illustrates a main routine of the control performed in a third embodiment of the present disclosure.

FIG. 9 is a flowchart that illustrates a main routine of the control performed in the third embodiment of the present disclosure. The processing of steps S100 to S112 in the main routine shown in FIG. 9 is as already described in the first embodiment. In the present routine, the ECU 40 proceeds to step S500 after calculating the basic intake stroke injection amount $F_{IB}$ in step S112. In step S500, the processing concerning the CA10-90 feedback control is performed. In addition, the role of step S112 with respect to the present routine is complementally described as follows. That is, in the present routine, the final intake stroke injection amount is successively corrected from the basic intake stroke injection amount $F_{IB}$ by the CA10-90 feedback control. Therefore, in order to calculate the basic intake stroke injection amount $F_{IB}$, either of the compression stroke injection amount after correction by the SA-CA10 feedback control and the compression stroke injection amount before the correction (that is, the basic compression stroke injection amount $F_{CB}$) may be used as well as the basic total fuel injection amount $F_{ALLB}$.

FIG. 10 is a flowchart that illustrates a subroutine of the processing concerning the CA10-90 feedback control. The processing of steps S300, S304 and S306 in the subroutine shown in FIG. 10 is as already described in the first embodiment. In the present routine, following the processing of step S300, the ECU 40 calculates a target CA10-90 (step S600). The ECU 40 stores a map (not shown in the drawings) that defines a relationship between the target CA10-90, and the engine speed, engine load factor and target ignition efficiency. The target CA10-90 can be determined, for example, as a value based on the same idea as the tolerable CA10-90 described above.

Further, following the processing of step S306, the ECU 40 calculates a difference ΔCA10-90 between the target CA10-90 and the actual CA10-90 that are obtained in steps S600 and 306, respectively (step S602). Next, the ECU 40 calculates a correction rate β for the intake stroke injection amount with the calculated difference ΔCA10-90 and a predetermined PI gain (that is, proportional gain and integral gain) (step S604). That is, the correction rate β is calculated in accordance with the magnitudes of the difference ΔCA10-90 and the integrated value thereof. In addition, the PI gain used for the CA10-90 feedback control is set in advance so as to be smaller than the PI gain used for the SA-CA10 feedback control.

Next, the ECU 40 calculates the intake stroke injection correction term $F_{IC}$ by multiplying the basic intake stroke injection amount $F_{IB}$ (refer to step S112) by the correction rate β (%) calculated in step S604 (step S606). The ECU 40 then corrects the intake stroke injection amount by adding this intake stroke injection correction term $F_{IC}$ to the basic intake stroke injection amount $F_{IB}$ (step S608). In the present embodiment, the value calculated in step S608 is treated as a final intake stroke injection amount subject to the CA10-90 feedback control.

According to the control of the third embodiment described so far, both of the compression stroke injection amount and the intake stroke injection amount are controlled with the respective feedback controls (that is, SA-CA10 feedback control and CA10-90 feedback control). Therefore, at the time of the slightly stratified-charge lean-burn operation, the compression stroke injection amount and the intake stroke injection amount can be controlled more accurately, as compared to the controls according to the first and second embodiments, so that each of the actual ignition delay period and the main combustion speed described above approaches a target value.

Moreover, with the control according to the third embodiment, the PI gain used for the SA-CA10 feedback control is increased as compared to the PI gain used for the CA10-90 feedback control. As a result of this, the response speed of adjustment of the compression stroke injection amount by the SA-CA10 feedback control becomes higher than the response speed of adjustment of the intake stroke injection amount by the CA10-90 feedback control. As already described, when the air-fuel ratio varies to the leaner side in the lean air-fuel ratio range that is leaner than the stoichiometric air-fuel ratio, the actual SA-CA10 becomes greater (that is, the ignition delay period becomes longer) and the actual CA10-90 becomes greater (that is, the main combustion speed becomes lower). However, to be more specific, there is the following difference concerning the characteristics of changes of the actual SA-CA10 and the actual CA10-90 with respect to the air-fuel ratio changing to the leaner side at the time of the slightly stratified-charge lean-burn operation. That is, the actual SA-CA10 has a characteristic that, when the level of a change of the air-fuel ratio to the leaner side exceeds a certain level or more, an increase of the actual SA-CA10 with respect to a change of the air-fuel ratio becomes steep. In contrast, the actual CA10-90 has a characteristic that it is hard to be affected by a lean level of the air-fuel ratio and that it increases gradually as compared to an increase on the actual SA-CA10 with respect to a change of the air-fuel ratio. It can therefore be said that, at the time of the slightly stratified-charge lean-burn operation, the actual SA-CA10 (ignition delay period) is highly affected by a change (variation) of the air-fuel ratio as compared to the actual CA10-90 (main combustion speed).

According to the above-described settings of the response speed of adjustment of the respective fuel injections, the response speed of adjustment of the compression stroke injection amount that has a relatively greater impact on the ignitability of the air-fuel mixture is relatively increased. The convergence of the actual SA-CA10 to the target SA-CA10 can thereby be faster than the convergence of the actual CA10-90 to the target CA10-90. Therefore, when a change (variation) of the air-fuel ratio is generated, the ignition delay period can be promptly caused to approach a target value, so that the stability of the slightly stratified-charge lean-burn operation can be easily ensured.

Additionally, in the third embodiment described above, the PI gain used for the SA-CA10 feedback control that is greater than the PI gain for the CA10-90 feedback control is used, so that a configuration is achieved in which the response speed of adjustment of the compression stroke injection amount is increased as compared to the response speed of adjustment of the intake stroke injection amount. However, this configuration may be achieved, for example, using the following setting of smoothing coefficient instead of or in addition to using the setting of the feedback gain (PI gain).

The following equation (4) represents a general equation for a smoothing processing. The current value $X_{sm}(n)$ after the smoothing processing can be represented using the last value $X_{sm}(n-1)$ after the smoothing processing, the current value $X(n)$ before the smoothing processing, and the smoothing coefficient N, as indicated by the equation (4). This kind of smoothing processing may be used to calculation of the differences ΔSA-CA10 and ΔCA10-90 described above, and a setting may be used such that a smoothing coefficient of the smoothing processing for the difference ΔSA-CA10 is smaller than a smoothing coefficient of the smoothing processing for the difference ΔCA10-90.

$$X_{sm}(n) = \frac{1}{N}\{(N-1)X_{sm}(n-1) + X(n)\} \quad (4)$$

Furthermore, according to the third embodiment described above, at the time of the slightly stratified-charge lean-burn operation, the feedback controls (that is, SA-CA10 feedback control and CA10-90 feedback control) for two kinds of fuel injection amounts and the CA50 feedback control for the spark timing are performed. In this example, the following setting may be used concerning the response speed of adjustment of the fuel injection amounts (that is, compression stroke injection amount and intake stroke injection amount) and the response speed of adjustment of the spark timing. In addition, the following settings can be achieved concretely using, for example, at least one of the setting of a feedback gain and the setting of the smoothing coefficient, as with the example described above.

More specifically, at the time of a transitional operation in which an engine operating condition, such as the engine speed or the engine load factor, is transitionally changing, it is favorable to adopt a setting that the response speed of adjustment of each of the fuel injection amounts is higher than the response speed of adjustment of the spark timing. This is because the setting described above can achieve the following advantageous effects at the time of the transitional operation in which a deviation of the actual air-fuel ratio with respect to the target air-fuel ratio (mainly, a deviation of intake air flow rate) is likely to occur. That is, according to the setting, the fuel injection amount that is a parameter that should be adjusted first to reduce the deviation of the air-fuel ratio when this kind of deviation occurs is corrected promptly. In this way, according to the setting, correction of the fuel injection amount that is more effective in terms of addressing the deviation of the air-fuel ratio can be advanced first. This can prevent overshoots of control amounts (that is, the actual SA-CA10, the actual CA10-90 and the actual CA50) with respect to the target values (that is, the target SA-CA10, the target CA10-90 and the target CA50) that may occur due to the fact that the adjustment of the spark timing is advanced first contrary to the setting described above. As a result of this, the exhaust gas emission or the drivability of the internal combustion engine 10 can be prevented from deteriorating due to the aforementioned deviation of the air-fuel ratio.

On the other hand, at the time of steady operation in which the engine operating condition does not transitionally change nor substantially change, it is favorable to increase the response speed of adjustment of the spark timing as compared to the response speed of adjustment of the fuel injection amount contrary to the setting described above. This is because, in order to cause the air-fuel ratio to approach a lean-burn limit at the time of the steady operation when the slightly stratified-charge lean-burn operation is performed, it can be said that it is favorable to adjust the fuel injection amount more gradually than approaching the actual CA50 to a proper value (target CS50) by increasing the response speed of adjustment of the spark timing. In addition, whether the internal combustion engine 10 is in the transitional operation or the steady operation can be determined with, for example, the processing of step S1100 described later.

Fourth Embodiment

Next, a fourth embodiment of the present disclosure will be described with reference to FIGS. 11, 12A and 12B.
[Control According to Fourth Embodiment]

In the present embodiment, a configuration is used in which a plurality of compression stroke injections and a plurality of intake stroke injections are performed in each combustion cycle at the time of the slightly stratified-charge lean-burn operation. Except for this point, the basic configuration of the control according to the present embodiment is the same as that according to the first embodiment.

FIG. 11 illustrates an example of a fuel injection operation executed at the time of the slightly stratified-charge lean-burn operation according to the fourth embodiment of the present disclosure. In the present embodiment, as shown in FIG. 11, the compression stroke injection is performed twice as an example, and the intake stroke injection is performed three times as an example. In the configuration in which a plurality of compression stroke injections are performed in one combustion cycle, it is required to determine how the compression stroke injection correction term $F_{CC}$ is applied to each compression stroke injection. This also applies to the intake stroke injection.

With regard to the above point, in the present embodiment, the compression stroke injection correction term $F_{CC}$ is equally divided into the respective two compression stroke injections, and, similarly, the intake stroke injection correction term $F_{IC}$ is equally divided into the respective three intake stroke injections. In addition, the way of changing the fuel injection period by the correction term $F_{CC}$ or $F_{IC}$ is not especially limited. That is, as shown in FIG. 11, the fuel injection period may be, for example, increased or decreased without changing the center position of the fuel injection period before and after the correction, or the fuel injection period may be, for example, changed without changing a starting timing or an end timing of the fuel injection period before and after the correction.
(Concrete Processing According to Fourth Embodiment)

FIGS. 12A and 12B are flowcharts that illustrate subroutines that are both combined with the main routine shown in FIG. 4 in the fourth embodiment of the present disclosure. That is, in the present embodiment, the processing concerning the SA-CA10 feedback control is performed in accordance with the subroutine shown in FIG. 12A instead of the subroutine shown in FIG. 6, and the processing concerning the CA10-90 correction control is performed in accordance with the subroutine shown in FIG. 12B instead of the subroutine shown in FIG. 7.

In the subroutine shown in FIG. 12A, the ECU 40 proceeds to step S700 after calculating the compression stroke injection correction term $F_{CC}$ in step S214. In step S700, the value obtained by dividing the compression stroke injection correction term $F_{CC}$ by a predetermined number of times (two in the present embodiment) is calculated as each of a correction term $F_{CC1}$ for the first-time compression stroke injection and a correction term $F_{CC2}$ for the second-time compression stroke injection. The ECU 40 then corrects the first-time compression stroke injection amount by adding the correction term $F_{CC1}$ to the basic compression stroke injection amount $F_{CB}$, and corrects the second-time compression stroke injection amount by adding the correction term $F_{CC2}$ to the basic compression stroke injection amount $F_{CB}$ (step S702).

In the subroutine shown in FIG. 12B, the ECU 40 proceeds to step S800 after obtaining the intake stroke injection correction term FTC in step S310 or S314. In step S800, the value obtained by dividing the intake stroke injection correction term $F_{IC}$ by a predetermined number of times (three in the present embodiment) is calculated as each of a correction term $F_{IC1}$ for the first-time intake stroke injection, a correction term $F_{IC2}$ for the second-time intake stroke injection and a correction term $F_{IC3}$ for the third-time intake stroke injection. The ECU 40 then corrects the first-time intake stroke injection amount by adding the correction term $F_{IC1}$ to the basic intake stroke injection amount $F_{IB}$, corrects the second-time intake stroke injection amount by adding the correction term $F_{IC2}$ to the basic intake stroke injection amount $F_{IB}$ and corrects the third-time intake stroke injection amount by adding the correction term $F_{IC3}$ to the basic intake stroke injection amount $F_{IB}$ (step S802).

According to the control of the fourth embodiment described so far, in the configuration in which both of a plurality of compression stroke injections and a plurality of intake stroke injections are performed in one combustion cycle, the individual compression stroke injection amounts and intake stroke injection amounts can be corrected in a conservative way with few advantages and few disadvantages.

In the fourth embodiment described above, the processing to distribute the intake stroke injection correction term $F_{IC}$ to the three intake stroke injections is executed with the CA10-90 correction control, as shown in FIG. 12B. However, the processing to distribute the intake stroke injection correction term $F_{IC}$ to a plurality of intake stroke injections may be executed with the CA10-90 feedback control (refer to FIG. 10) in the identical manner with FIG. 12B. This also applies to a fifth embodiment described next.

Moreover, the manner of distributing the correction terms $F_{CC}$ and $F_{IC}$ described in the fourth embodiment can also be used for a configuration in which either one of the compression stroke injection and the intake stroke injection is divided into a plurality of injections. This also applies to the fifth embodiment described next.

Fifth Embodiment

Figure 13:
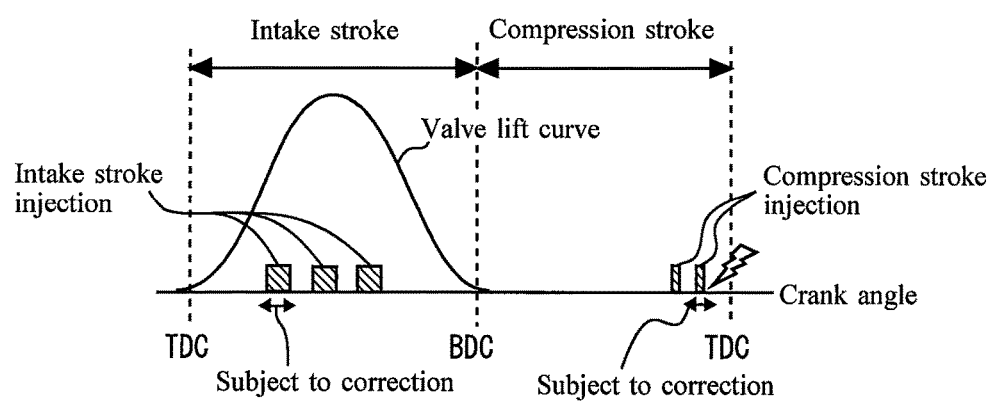
FIG. 13 illustrates an example of a fuel injection operation executed at the time of the slightly stratified-charge lean-burn operation according to a fifth embodiment of the present disclosure.
Figure 14:
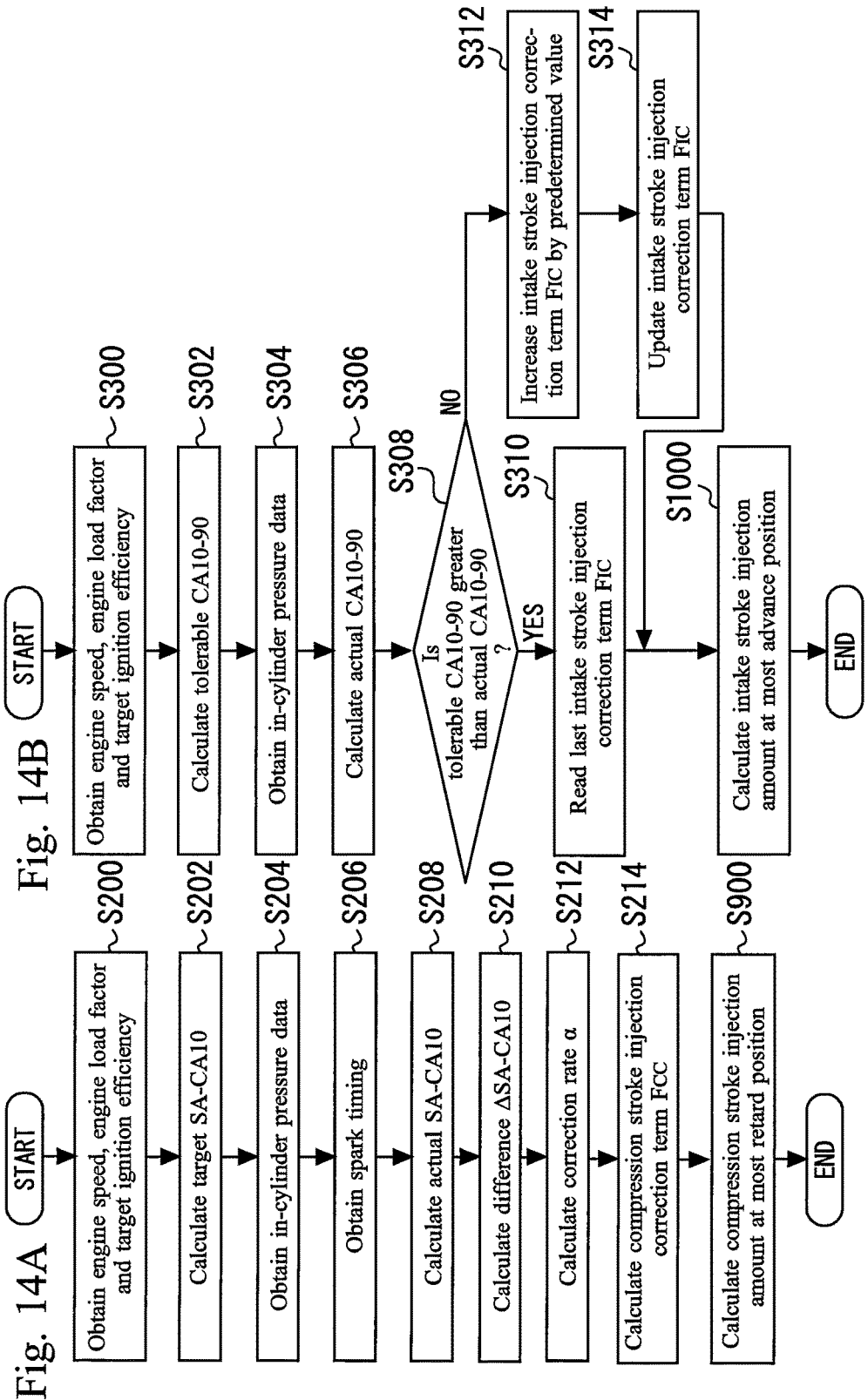
FIGS. 14A and 14B are flowcharts that illustrate subroutines that are both combined with the main routine shown in FIG. 4 in the fifth embodiment of the present disclosure.

Next, a fifth embodiment of the present disclosure will be described with reference to FIGS. 13, 14A and 14B.
[Control According to Fifth Embodiment]
FIG. 13 illustrates an example of a fuel injection operation executed at the time of the slightly stratified-charge lean-burn operation according to the fifth embodiment of the present disclosure. The present embodiment is different from the fourth embodiment in a point of handling of the correction terms $F_{CC}$ and $F_{IC}$. To be more specific, in the present embodiment, as shown in FIG. 13, the compression stroke injection correction term $F_{CC}$ is not distributed to the individual compression stroke injections, but is used for the second-time compression stroke injection, that is, a compression stroke injection performed at a most retard position (in other words, closest to the ignition timing). On the other hand, the intake stroke injection correction term $F_{IC}$ is not distributed to the individual intake stroke injections, but is used for the first-time intake stroke injection, that is, an intake stroke injection performed at a most advance position (in other words, at the most distant from the ignition timing).
(Concrete Processing According to Fifth Embodiment)
FIGS. 14A and 14B are flowcharts that illustrate subroutines that are both combined with the main routine shown in FIG. 4 in the fifth embodiment of the present disclosure. That is, in the present embodiment, the processing concerning the SA-CA10 feedback control is performed in accordance with the subroutine shown in FIG. 14A instead of the subroutine shown in FIG. 12A, and the processing concerning the CA10-90 correction control is performed in accordance with the subroutine shown in FIG. 14B instead of the subroutine shown in FIG. 12B.

In the subroutine shown in FIG. 14A, the ECU 40 proceeds to step S900 after calculating the compression stroke injection correction term $F_{CC}$ in step S214. In step S900, only the compression stroke injection amount at a most retard position is corrected by adding the compression stroke injection correction term $F_{CC}$ to the basic compression stroke injection amount $F_{CB}$ for the second-time compression stroke injection.

In the subroutine shown in FIG. 14B, the ECU 40 proceeds to step S1000 after obtaining the intake stroke injection correction term $F_{IC}$ in step S310 or S314. In step S1000, only the intake stroke injection amount at a most advance position is corrected by adding the intake stroke injection correction term $F_{IC}$ to the basic intake stroke injection amount $F_{IB}$ for the first-time intake stroke injection.

In a plurality of fuel injections performed in a divided manner, as a fuel injection timing is closer to the spark timing, the local air-fuel ratio of the air-fuel mixture located around the spark plug 30 during sparking (that is, stratified mixture) is easy to be changed. Thus, as a fuel injection timing is closer to the spark timing, the influence of the air-fuel mixture on the ignitability becomes greater. Further, In a plurality of fuel injections performed in a divided manner, as a fuel injection timing is more distant from the spark timing, the air-fuel ratio of the overall air-fuel mixture in the cylinder (that is, homogeneous mixture) is easy to be changed. Thus, as a fuel injection timing is more distant from the spark timing, the influence of the air-fuel mixture on the main combustion speed becomes greater. According to the control of the fifth embodiment described so far, the actual SA-CA10 can be caused to approach the target SA-CA10 by correcting only the second-time compression stroke injection, whose influence on the ignitability (that is, whose contribution to the ignitability) is the highest in a plurality of compression stroke injections. Further, the main combustion speed is controlled so as not to fall below the tolerable value (the lower limit described above) by correcting only the first-time intake stroke injection, whose influence on the main combustion speed (that is, whose contribution to the main combustion speed) is the highest in a plurality of intake stroke injections. Therefore, according to the control of the present embodiment, in the configuration in which both of a plurality of compression stroke injections and a plurality of intake stroke injections are performed in one combustion cycle, the compression stroke injection amount and the intake stroke injection amount can be corrected with a superior manner in the controllability of the ignition delay period and the main combustion speed. As a result of this, each of the correction terms $F_{CC}$ and $F_{IC}$ can be properly determined without deficiency and excess.

Sixth Embodiment

Next, a sixth embodiment of the present disclosure will be described with reference to FIGS. 15 and 16.
[Control According to Sixth Embodiment]
The control according to the present embodiment corresponds to one obtained by adding, to the control according to the first embodiment, countermeasures against an issue on a transitional operation described below. That is, the control at the time of the steady operation is the same as that according to the first embodiment. In addition, the control at the time of the transitional operation described below may be based on the control according to the third embodiment (that is, the control in association with the CA10-90 feedback control) instead of the control according to the first embodiment (that is, the control in association with the CA10-90 correction control).
(Issue on Transitional Operation)
At the time of the transitional operation in which the engine operating condition, such as the engine speed or the engine load factor, is transitionally changing, a deviation of the actual air-fuel ratio to the target air-fuel ratio is likely to occur. In more detail, the causes of this kind of deviation of the air-fuel ratio are mainly a deviation of the amount of air taken into a cylinder. A delay of transportation of the air mainly corresponds to this deviation of the air amount. Further, when the back pressure of a cylinder changes due to a transitional change of the opening and closing timings of intake and exhaust valves, the residual gas amount (that is, the internal EGR gas amount) changes and the in-cylinder pressure during the intake stroke thereby changes. The aforementioned deviation of the air amount includes a deviation of the air amount due to this kind of change in the in-cylinder pressure. Moreover, the causes of the deviation of the air-fuel ratio includes a deviation of the fuel amount other than the deviation of the air amount. The deviation of the fuel amount may occur due to, for example, a fluctuation of the fuel pressure. Furthermore, in an example of an internal combustion engine in which fuel is directly injected into a cylinder, the deviation of the fuel amount may occur due to a pressure difference between the in-cylinder pressure (that is, gas pressure) and the fuel pressure.

Controls to correct the operation amount of an actuator with reference to an actual value of a control amount, such as the SA-CA10 feedback control and the CA10-90 correction control, are potentially accompanied by a response delay. Thus, when the above-described deviation of the air-fuel ratio occurs during the transitional operation, the drivability or the exhaust gas emission of the internal combustion engine 10 may deteriorate due to this kind of response delay. As described also in the third embodiment, the actual SA-CA10 (that is, the ignition delay period) at the time of the slightly stratified-charge lean-burn operation is easy to be highly affected by a change (variation) of the air-fuel ratio as compared to the actual CA10-90 (that is, the main combustion speed). It can therefore be said that the influences of the aforementioned deviation of the air-fuel ratio on the slightly stratified-charge lean-burn operation is likely to be greater for the compression stroke injection amount based on the SA-CA10 than for the intake stroke injection amount based on the CA10-90. Further, the transitional deviation includes a deviation of the air-fuel ratio to the richer side and a deviation of the air-fuel ratio to the leaner side. Since, when the deviation of the air-fuel ratio to the leaner side occurs, a misfire is likely to occur, this deviation may cause a greater impact on the drivability of the internal combustion engine 10. Consequently, in order to address this kind of response delay, it can be said that it is favorable to give greater weight to prevention of a response delay in correcting the deviation of the air-fuel ratio to the leaner side than that in correcting the deviation of the air-fuel ratio to the richer side.

(Outline of Control at Time of Transitional Operation)

Accordingly, in the present embodiment, in order to prevent deterioration of the drivability due to the aforementioned deviation of the air-fuel ratio, a feedforward control is used as the control of the compression stroke injection amount during the transitional operation. Specifically, in the present embodiment, at the time of the transitional operation, the SA-CA10 feedback control is stopped, and the compression stroke injection amount is controlled using a value obtained by adding the following compression stroke injection increment value to the basic compression stroke injection amount $F_{CB}$ that is according to the engine speed and the engine load factor. That is, the compression stroke injection amount is adjusted using the compression stroke injection increment value that is determined in advance on the basis of the engine load factor and a time change rate thereof. In addition, as described above, in the present embodiment, the control of the intake stroke injection amount, whose influence on the deviation of the air-fuel ratio is relatively small, is performed regardless of whether the internal combustion engine 10 is during the transitional operation or not, as well as the feedback control for the spark timing based on the CA50 (that is, the CA50 feedback control).

(Concrete Processing According to Sixth Embodiment)

Figure 15:
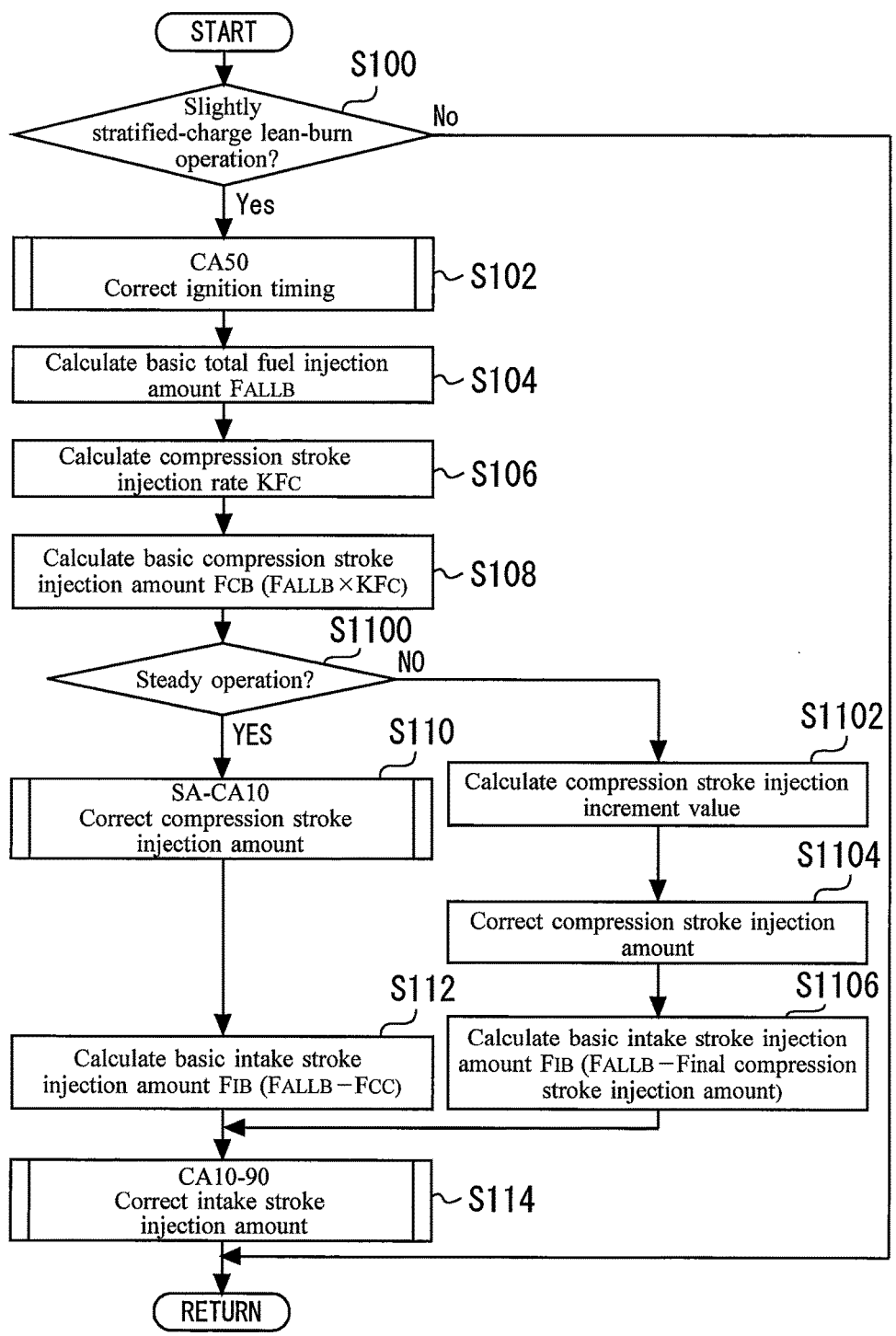
FIG. 15 is a flowchart that illustrates a main routine of the control performed in a sixth embodiment of the present disclosure.

FIG. 15 is a flowchart that illustrates a main routine of the control performed in the sixth embodiment of the present disclosure. The processing of steps S100 to S114 in the main routine shown in FIG. 15 is as already described in the first embodiment. In the present routine, the ECU 40 proceeds to step S1100 after calculating the basic compression stroke injection amount $F_{CB}$ in step S108. In step S1100, it is determined whether the internal combustion engine 10 is during the steady operation or the transitional operation.

To be more specific, whether the internal combustion engine 10 is during the steady operation or the transitional operation can be determined based on, for example, whether or not the time change rate of the engine load factor (that is, d(load factor)/dt) is less than a predetermined value $K_{th}$. Also, the determination on whether the internal combustion engine 10 is during the steady operation or the transitional operation may be performed using, for example, one or a plurality of manners described below instead of or in addition to the method described above.

That is to say, the determination described above may be performed on the basis of whether or not a time change rate of the engine speed is less than a predetermine value. Alternatively, when the difference ΔSA-CA10 between the target SA-CA10 that is a value according to the engine operating condition and the actual SA-CA10 is less than a predetermined value, the internal combustion engine 10 may be determined to be during the steady operation, while when the difference ΔSA-CA10 is greater than or equal to the predetermined value, the internal combustion engine 10 may be determined to be during the transitional operation. Further, in a hybrid vehicle that includes, as its power sources, an electrically driven motor as well as the internal combustion engine 10, or in a vehicle that includes a continuously variable transmission (CVT) combined with the internal combustion engine 10, a determination as described below may be performed. That is, these vehicle may use a steady mode in which, when a vehicle-required engine torque changes, the internal combustion engine 10 is operated as steadily as possible with use of control of the electrically driven motor or the CVT. Also, in these vehicle, if a high engine torque with a level that is unable to be satisfied using this kind of the steady mode is requested, a transitional mode that satisfies such a torque request by using the internal combustion engine 10 in addition to the electrically driven motor or the CVT may be used. In a vehicle in which this kind of control is performed, the following determination may be performed, for example. That is, when a change rate of the depression amount of the accelerator pedal is less than a predetermined value, it may be determined that the steady mode is currently in use and that the internal combustion engine 10 is, therefore, during the steady operation. On the other hand, when the change rate of the depression amount of the accelerator pedal is greater than or equal to the predetermined value, it may be determined that the transitional mode is currently in use and that the internal combustion engine 10 is, therefore, during the transitional operation. Furthermore, in the vehicle that includes the CVT, when a manual mode in which a driver chooses a gear ratio of the CVT is selected, the internal combustion engine 10 may be determined to be during the transitional operation, while an automatic mode in which the vehicle automatically controls the gear ratio of the CVT is selected, the internal combustion engine 10 may be determined to be during the steady operation.

The processing performed when it is determined in step S1100 that the internal combustion engine 10 is during the steady operation is the same as that according to the first embodiment. On the other hand, when the ECU 40 determines in step S1100 that the internal combustion engine 10 is during the transitional operation, the ECU 40 calculates a compression stroke injection increment value (step S1102). FIG. 16 conceptually illustrates the setting of a map referred to in the sixth embodiment of the present disclosure in order to determine the compression stroke injection increment value. In this map, the compression stroke injection increment values are set in association with the engine load factor and the time change rate thereof for every predetermined engine speed. The compression stroke injection increment values are also set in advance as values that can prevent deterioration of combustion and misfire even in a condition in which unexpected uncertainties remain. In more detail, the compression stroke injection increment values are set so as to be greater as the time change rate of the engine load factor is greater and be greater as the engine load factor is smaller. Thus, according to the setting of the map described above, a maximum value of the compression stroke injection increment values is obtained when the time change rate of the engine load factor is greater and the engine load factor is greater.

Next, the ECU 40 corrects the compression stroke injection amount by adding, to the basic compression stroke injection amount $F_{CB}$ (refer to step S108), the compression stroke injection increment value calculated in step S1102 (step S1104). At the time of the transitional operation, the feedforward control of the compression stroke injection amount is performed in accordance with the processing of this step S1104. The ECU 40 then calculates, as the basic intake stroke injection amount $F_{IB}$, a value obtained by subtracting the final compression stroke injection amount (that is, the compression stroke injection amount after the addition of the compression stroke injection increment value) calculated in step S1104 from the basic total fuel injection amount $F_{ALLB}$ calculated in step S104 (step S1106).

Figure 16:
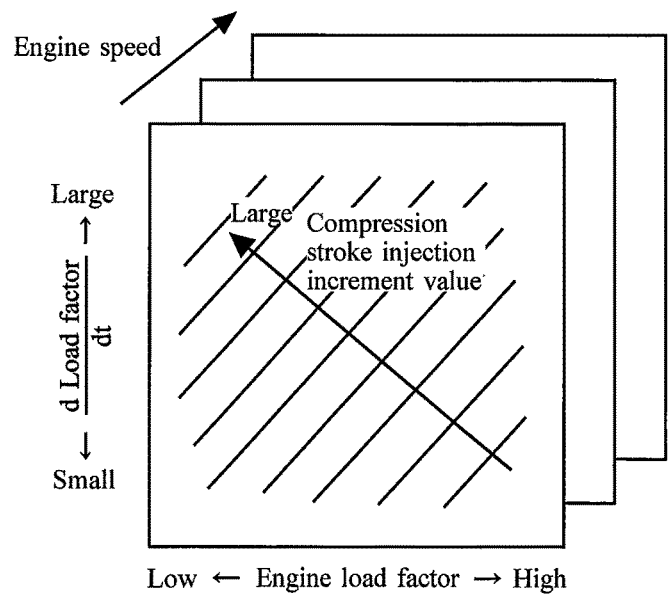
FIG. 16 conceptually illustrates the setting of a map referred to in the sixth embodiment of the present disclosure in order to determine a compression stroke injection increment value.

According to the control of the sixth embodiment described so far, at the time of the transitional operation, the SA-CA10 feedback control is stopped, and the compression stroke injection amount is increased from the basic total fuel injection amount $F_{ALLB}$ by the compression stroke injection increment value calculated in accordance with the relation shown in FIG. 16. The engine load factor is a charge ratio of the air taken into a cylinder. When the engine load factor changes by a certain change amount, the ratio of this change amount to the value of the engine load factor becomes greater as the engine load factor is smaller. Thus, the influence of the deviation of the air-fuel ratio (mainly, the deviation of the air amount) at the time of the transitional operation becomes greater as the engine load factor is smaller. Further, the time change rate of the engine load factor becomes greater, the deviation of the air-fuel ratio becomes greater. Therefore, according to the setting of the map shown in FIG. 16, the compression stroke injection increment value can be determined so as to be greater as the influence of the deviation of the air-fuel ratio is greater. As a result of this, in a condition in which the deviation of the air-fuel ratio to the leaner side occurs even if a fuel injection operation is performed in association with the compression stroke injection with the basic compression stroke injection amount $F_{CB}$ at the time of the transitional operation (that is, in a condition in which an increment of the fuel injection amount is required), an increment of the compression stroke injection amount can be performed promptly without a response delay. Accordingly, deterioration of the drivability (for example, occurrence of misfire), which may be produced due to the fact that, if the SA-CA10 feedback control is used to adjust the compression stroke injection amount, the air-fuel ratio is unable to be fully corrected due to its response delay, can be prevented.

The following control may be added to the control of the compression stroke injection amount based on the SA-CA10 that is performed at the time of the transitional operation in the sixth embodiment described above. That is, as described above, the compression stroke injection increment values are determined so as to enable prevention of the deterioration of combustion and misfire even in a condition in which unexpected uncertainties remain. Further, this compression stroke injection increment value can be decreased by retarding the target CA50 from a value of CA50 at which the MBT is obtained. To be more specific, by retarding the target CA50 so that the ignition timing (that is, nearly identical to the combustion start point CA0) is shifted to the vicinity of the compression dead center during execution of the CA50 feedback control, the ignition can be produced in a condition in which the in-cylinder temperature and the in-cylinder pressure are the highest. The ignitability can therefore be improved. As a result of this, with this kind of retard of the target CA50, the compression stroke injection amount necessary to ensure an ignitability equal to when the retard is not performed can be decreased. Namely, with this retard, the compression stroke injection increment value described above can be decreased. Accordingly, in order to achieve this kind of advantageous effects that can decrease the compression stroke injection increment value, a map that is obtained by replacing the compression stroke injection increment value in the map shown in FIG. 16 with the retard amount of the target CA50 may be prepared separately, and the retard amount of the target CA50 at the time of the transitional operation may be determined on the basis of the engine load factor and the time change rate thereof. According to this kind of map, the target CA50 can be determined so that when the compression stroke injection increment value is increased as a result of the deviation of the air-fuel ratio increasing, the retard amount of the target CA50 increases.

Seventh Embodiment

Next, a seventh embodiment of the present disclosure will be described with reference to FIGS. 17A to 20.
[Control According to Seventh Embodiment]

The control according to the present embodiment is based on the control according to the first embodiment, and corresponds to one obtained by associating the following learning processing with both of the control of the compression stroke injection amount based on the SA-CA10 and the control of the intake stroke injection amount based on the CA10-90. In addition, the learning processing described below may be combined with the control according to the third embodiment (that is, the control associated with the CA10-90 feedback control) instead of the control according to the first embodiment (that is, the control associated with the CA10-90 correction control).
(Learning Processing Associated with SA-CA10 Feedback Control and CA10-90 Feedback Control)

In the present embodiment, the learning processing is executed in order to enable to obtain, as learned values, a correction term of the compression stroke injection amount required to reduce a steady gap of the actual SA-CA10 with respect to the target SA-CA10 and a correction term of the intake stroke injection amount required to reduce a steady increase of the actual CA10-90 with respect to the tolerable CA10-90 used in the CA10-90 correction control.

According to the correction of the compression stroke injection amount and the intake stroke injection amount based on the learned values that are obtained by the learning processing described above, the actual SA-CA10 can be caused to quickly converge (that is, a response delay of the SA-CA10 feedback control can be reduced) after this feedback control starts (refer to FIG. 20 described later, as an example). In addition, in a condition in which the actual CA10-90 is greater than the tolerable CA10-90 when the CA10-90 correction control is started, the CA10-90 can be corrected so as to quickly fall below the tolerable CA10-90.

There are two causes of occurrence of a steady gap of the actual SA-CA10 from the target SA-CA10 in the SA-CA10 feedback control or occurrence of a steady gap (i.e., a steady increase) of the actual CA10-90 from the tolerable CA10-90 in the CA10-90 correction control. One of the two causes is that the actual air-fuel ratio steadily deviates from the target air-fuel ratio. This phenomenon is produced due to an error of at least one of the intake air amount and the fuel injection amount. Also, this error may be produced due to, for example, an error of the air flow sensor 44, clogging of a nozzle hole of the in-cylinder injection valve 26 or the port injection valve 28 due to accumulation of deposits, or a drop of the fuel pressure from a specified value. As just described, one of the two causes is a deviation between an instruction value and an actual value concerning the intake air amount and the fuel injection amount.

The other of the two causes is that combustion characteristics change from target characteristics (that is, initial characteristics). This phenomenon may be produced due to, for example, individual differences (such as, variation of tumble flow or variation of mounting angle of the spark plug), a change with time (such as, a change of tumble flow due to accumulation of deposits on an intake port), or an environmental change (such as, a change of the humidity of outdoor air) of the internal combustion engine 10.

Each of the SA-CA10 feedback control and the CA10-90 correction control executes correction of the fuel injection amount to reduce the deviation without distinguishing its causes of the actual SA-CA10 or the actual CA10-90. Because of this, when the learning processing is performed without a special consideration about the two causes described above, if a deviation due to both of these two causes is produced, the deviation is collectively taken into the learned value. As a result of this, the individual learned values held by the learning map are based on correction terms with respect to different causes. Therefore, learned values adjacent with each other on an axis of the map are easy to be derived from different causes, and it becomes difficult to calculate a highly accurate value in performing the interpolation or the extrapolation based on these learned values adjacent to each other. In order to reduce the occurrence of this kind of situation, it is conceivable to try to improve the learning accuracy by increasing the number of the axes of the map. However, since an area of the map necessary to perform the learning increases as a result, a lot of time is required to obtain a sufficient learning results, and it is impracticable.

Accordingly, in the present embodiment, in order to ensure a high learning accuracy while reducing the time required to perform the learning, the learning processing is executed in the following manner. To be more specific, the correction rate $\alpha$ (%) (that is, a value necessary to eliminate a steady deviation of the actual SA-CA10 with respect to the target SA-CA10) for the compression stroke injection amount obtained by the SA-CA10 feedback control when a learning execution condition described later (refer to step S1202) is met is learned divided into the causes of the deviation of the actual SA-CA10. Further, the correction rate $\beta$ (%) (that is, a value necessary to eliminate a steady deviation (increase) of the actual CA10-90 with respect to the tolerable CA10-90) for the intake stroke injection amount obtained by the CA10-90 correction control when the same learning execution condition is met is learned divided into the causes of the deviation of the actual CA10-90.

(Learning of Correction Rate for Each Cause of Deviation with Three Learning Maps)

The basic total fuel injection amount $F_{ALLB}$ is a sum of a product of the compression stroke injection rate $KF_C$ and the basic total fuel injection amount $F_{ALLB}$ and a product of the intake stroke injection rate $KF_I$ and the basic total fuel injection amount $F_{ALLB}$, as shown in the following equation (5). In addition, a sum of the compression stroke injection rate $KF_C$ and the intake stroke injection rate $KF_I$ is 1.

$$F_{ALLB}=KF_C \times F_{ALLB}+KF_I \times F_{ALLB} \quad (5)$$

Further, a total injection correction amount $\Delta F_{ALL}$ corresponds to a sum of a correction term based on the correction rate $\alpha$ of the compression stroke injection for the SA-CA10 feedback control (that is, the compression stroke injection correction term $F_{CC}$ described above) and a correction term based on the correction rate $\beta$ of the intake stroke injection for the CA10-90 correction control (that is, the intake stroke injection correction term $F_{IC}$ described above). The total injection correction amount $\Delta F_{ALL}$ can be represented using the basic total fuel injection amount $F_{ALLB}$, the correction rates $\alpha$ and $\beta$, the compression stroke injection rate $KF_C$ and the intake stroke injection rate $KF_I$, as shown in the following equation (6).

$$\Delta F_{ALL}=(KF_C \times \alpha+KF_I \times \beta) \times F_{ALLB} \quad (6)$$

Since if the correction rates $\alpha$ and $\beta$ in equation (6) are the object of a learning, the influences of the two causes of the deviation descried above are mixed together, the issue described above is produced. On the other hand, the total injection correction amount $\Delta F_{ALL}$ can also be considered as a sum of the respective correction rates for the aforementioned two causes of the deviation. Thus, where $\gamma$ (%) denotes a correction rate corresponding to one of the two causes (that is, a change of combustion characteristics and $\delta$ (%) denotes a correction rate corresponding to the other of the two causes (that is, a deviation of the air-fuel ratio), the total injection correction amount $\Delta F_{ALL}$ can also be represented as shown in the following equation (7). Further, equation (8) can be developed from equations (6) and (7). Moreover, as shown in equation (8), the correction rates $\gamma$ and $\delta$ can also be represented divided into correction rates $\gamma_C$ and $\delta_C$ for the compression stroke injection and correction rates $\gamma_I$ and $\delta_I$ for the intake stroke injection. On that basis, the term concerning the compression stroke injection and the term concerning the intake stroke injection in equation (8) can also be represented in a divided manner as shown in the following equations (9) and (10).

$$\Delta F_{ALLB}=(\gamma+\delta) \times F_{ALLB} \quad (7)$$

$$KF_C \times \alpha+KF_I \times \beta=\gamma+\delta=\gamma_C+\gamma_I+\delta_C+\delta_I \quad (8)$$

$$KF_C \times \alpha=\gamma_C+\delta_C \quad (9)$$

$$KF_I \times \beta=\gamma_I+\delta_I \quad (10)$$

If a change of the combustion characteristics that is one of the two causes described above occurs, the correlation between the air-fuel ratio and the target SA-CA10 changes, and, as a result, it is conceivable that the value of the actual air-fuel ratio changes due to a change of the combustion characteristics when the actual SA-CA10 converges with the target SA-CA10 by the SA-CA10 feedback control. Similarly, if a change of the combustion characteristics occurs, the correlation between the air-fuel ratio and the tolerable CA10-90 changes, and, as a result, it is conceivable that the value of the actual air-fuel ratio changes due to a change of the combustion characteristics when the actual CA10-90 converges with a value equivalent to the tolerable CA10-90 by the CA10-90 correction control.

As described above, it is conceivable that the air-fuel ratio changes as a result of a change of the combustion characteristics. Therefore, it can be said that a portion (that is, a correction rate) contributing a change of the air-fuel ratio, which is included in the total correction rate ($KF_C \times \alpha + KF_I \times \beta$) of the compression stroke injection and the intake stroke injection, corresponds to the correction rate $\alpha$ that is a portion relating to a change of the combustion characteristics (in more detail, a portion for correction to decrease the deviation of the actual SA-CA10 and the deviation of the actual CA10-90 that are due to a change of the combustion characteristics). Accordingly, in the present embodiment, the correction rate $\gamma$ is represented as a ratio, to the actual air-fuel ratio A/F, of the difference obtained by subtracting the actual air-fuel ratio A/F from the target air-fuel ratio $A/F_{tgt}$. In addition, the target air-fuel ratio $A/F_{tgt}$ in the following equation (11) can be obtained as a value according to the engine operating condition (the engine load factor and the engine speed, for example) from a map (not shown in the drawings). The actual air-fuel ratio in equation (11) can be obtained using the air-fuel ratio sensor 34 for detecting the actual air-fuel ratio that is affected by both of the compression stroke injection and the intake stroke injection.

$$\gamma = \frac{A/F_{tgt} - A/F}{A/F} \times 100 \tag{11}$$

On the other hand, it can be said that 8 that is the remaining correction rate obtained by subtracting, from the total correction rate ($KF_C \times \alpha + KF_I \times \beta$), the correction rate $\gamma$ that is a portion relating to a change of the combustion characteristics corresponds to a correction rate necessary to achieve the target air-fuel ratio $A/F_{tgt}$, more specifically, a correction rate to decrease a steady deviation of the actual air-fuel ratio A/F with respect to the target air-fuel ratio $A/F_{tgt}$ that occurs when combustion is performed with feed-forward values (that is, the basic intake air amount and the basic total fuel injection amount $F_{ALLB}$) as they are. In other words, this correction rate S corresponds to a correction rate relating to one of the two causes described above (that is, a steady deviation of the actual air-fuel ratio from the target air-fuel ratio), and has a value based on a sum of errors of the intake air amount and the fuel injection amount.

It is conceivable that, if the correction rates $\gamma_C$, $\delta_C$, $\gamma_I$ and $\delta_I$ represented in equations (9) and (10) can be obtained and learned, an accurate learning can be performed separately for each of the two causes of deviation described above. The correction rates $\alpha$ and $\beta$ can be obtained with use of the SA-CA10 feedback control and the CA10-90 correction control, respectively. The correction rate $\gamma$ can be calculated from the target $A/F_{tgt}$ and the actual air-fuel ratio A/F according to equation (11). A correction rate subject to the learning is thus required to be described with the correction rates $\alpha$, $\beta$ and $\gamma$ that are obtainable.

As shown in the following equations (12) and (13), the correction rate $\delta$ can be represented divided into the correction rate $\delta_C$ for the compression stroke injection and the correction rate $\delta_I$ for the intake stroke injection, with use of the compression stroke injection rate $KF_C$ and the intake stroke injection rate $KF_I$. This is because it is conceivable that, since the correction rate $\delta$ relates to the deviation of the air-fuel ratio (that is, errors of the intake air amount and the fuel injection amount), the correction rate $\delta$ is divided using the compression stroke injection rate $KF_C$ and the intake stroke injection rate $KF_I$ that represent the ratios of the amounts of the respective injections. Therefore, if the learning for the correction rate $\delta$ is performed, the learned values of the correction rates $\delta_C$ and $\delta_I$ for the respective injections can be calculated using equations (12) and (13).

$$\delta_C = KF_C \times \delta \tag{12}$$

$$\delta_I = KF_I \times \delta \tag{13}$$

Based on the above, it can be said eventually that learned values $\gamma_{CG}$, $\delta_{CG}$, $\gamma_{IG}$ and $\delta_{IG}$ of the correction rates $\gamma_C$, $\delta_C$, $\gamma_I$ and $\delta_I$ can be calculated by performing the learning with respect to the three correction rates $\gamma_C$, $\gamma_I$ and $\delta$. Further, by transforming equation (8) into the following equation (14), the correction rate $\delta$ can be represented using values that are obtainable during execution of the control according to the present embodiment. In addition, by obtaining the following equation (15) from equations (9), (12) and (14), the correction rate $\gamma_C$ can be represented using values that are similarly obtainable, and, by obtaining the following equation (16) from equations (10), (13) and (14), the correction rate $\gamma_I$ can be represented using values that are similarly obtainable.

$$\delta = KF_C \times \alpha + KF_I \times \beta - \gamma \tag{14}$$

$$\gamma_C = KF_C \times (\alpha - \delta) = KF_C \times \{KF_I \times (\alpha - \beta) + \gamma\} \tag{15}$$

$$\gamma_I = KF_I \times (\beta - \delta) = KF_I \times \{KF_C \times (\beta - \alpha) + \gamma\} \tag{16}$$

Figure 17A:
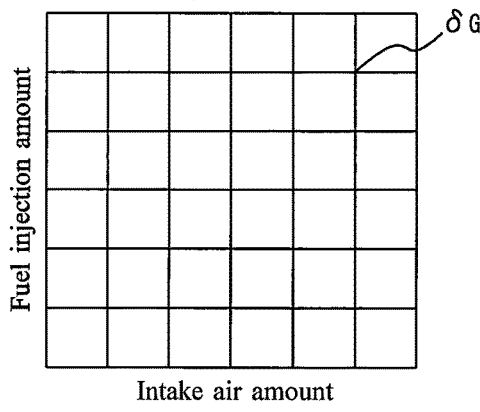
FIGS. 17A to 17C are diagrams for explaining the configuration of learning maps used for a learning processing according to a seventh embodiment of the present disclosure.
Figure 17B:
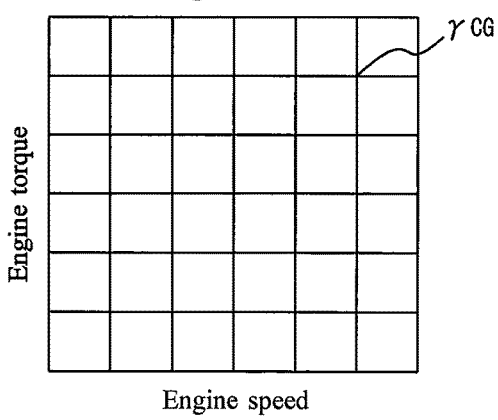
Figure 17C:
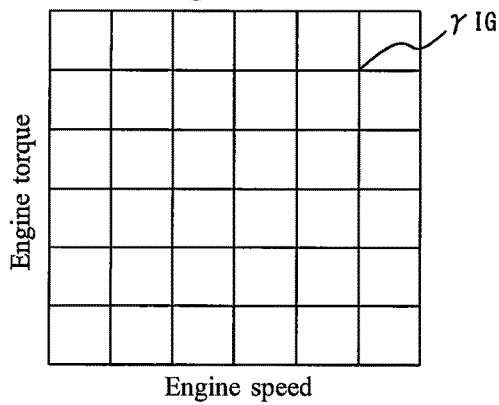

FIGS. 17A to 17C are diagrams for explaining the configuration of learning maps used for the learning processing according to the seventh embodiment of the present disclosure. In the present embodiment, three correction rates $\delta$, $\gamma\gamma_C$ and $\gamma_I$ that are respectively calculated according to equations (14) to (16) are subject to the learning, and three learning maps that are minimum necessary are used.

FIG. 17A shows a learning map for the correction rate $\delta$. In this learning map, an intake air mount correlation value and a fuel injection amount correlation value are used as the axes of the map, and the learned values $\delta_G$ of the correction rate $\delta$ are associated with these correlation values. In the present embodiment, the intake air amount obtained using the air flow sensor 44 is used as an example of the intake air amount correlation value, and the target (final) total fuel injection amount (that is, a sum of the respective fuel injection amounts instructed to the in-cylinder injection valve 26 and the port injection valve 28) $F_{ALL}$ is used as an example of the fuel injection amount correlation value.

FIG. 17B shows a learning map for the correction rate $\gamma_C$. In this learning map, an engine torque correlation value and an engine speed correlation value are used as the axes of the map, and the learned values $\gamma_{CG}$ of the correction rate $\gamma_C$ are associated with these correlation values. In the present embodiment, the engine load factor (that is, the charge ratio of the air taken into a cylinder) is used as an example of the engine torque correlation value, and the engine speed obtained using the crank angle sensor 42 is used as an example of the engine speed correlation value.

FIG. 17C shows a learning map for the correction rate $\gamma_I$. In this learning map, as with the learning map for the correction rate $\gamma_C$, the engine torque correlation value and the engine speed correlation value are used as the axes of the map, and the learned values $\gamma_{IG}$ of the correction rate $\gamma_I$ are associated with these correlation values. In addition, each of the learned values $\delta_G$, $\gamma_{CG}$ and $\gamma_{IG}$ of these three learning maps are stored in association with the values of axes of the map at each grid point on the map. Further, if it is required to calculate the learned values $\delta_G$, $\gamma_{CG}$ and $\gamma_{IG}$ of the correction rates δ, $\gamma_C$ and $\gamma_I$ at positions distant from the grid points, such learned values are obtained using the interpolation or extrapolation based on the grid points adjacent to each other.

(Concrete Processing According to Seventh Embodiment)

Figure 18:
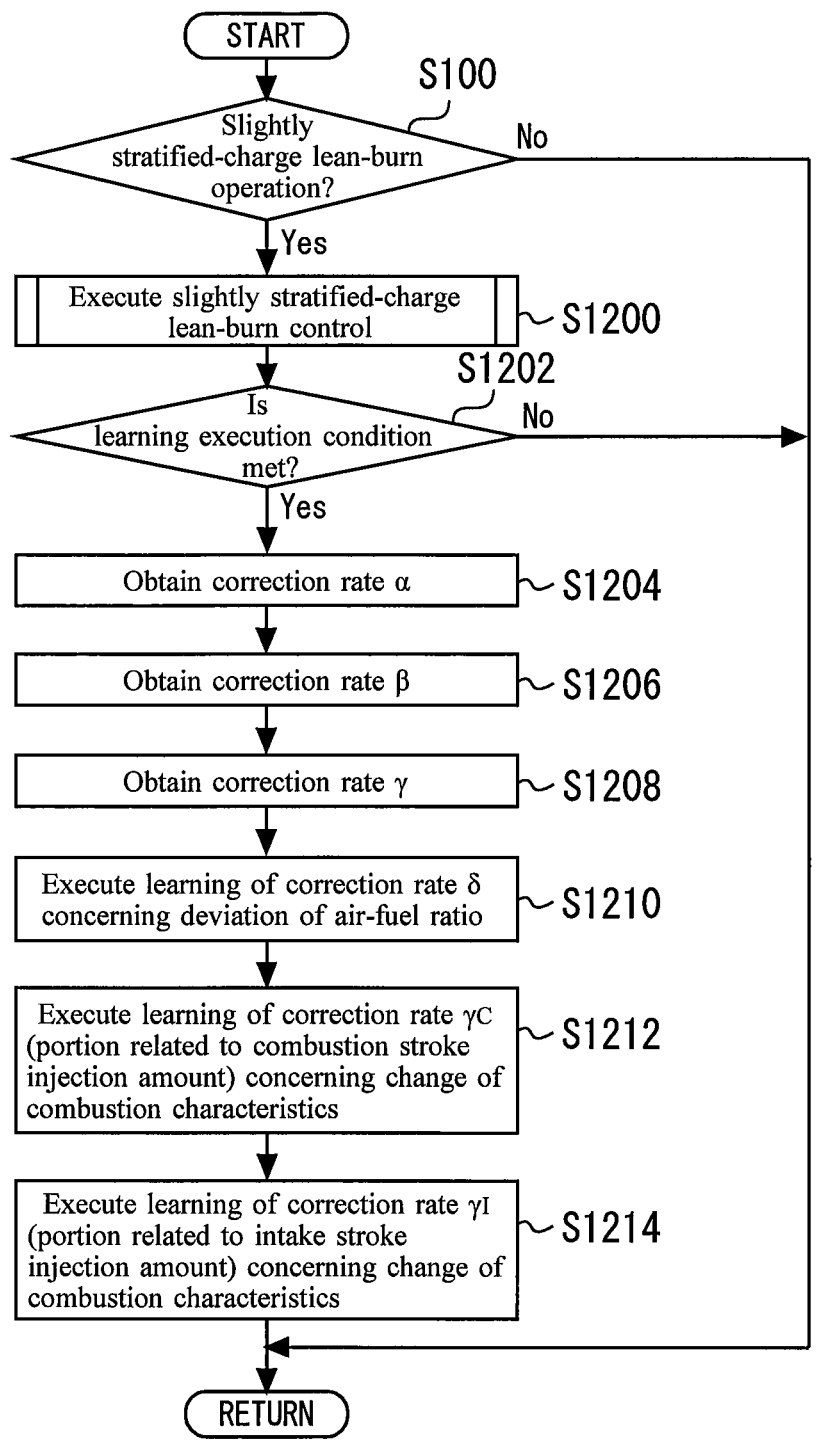
FIG. 18 is a flowchart that illustrates a main routine of the control performed in the seventh embodiment of the present disclosure.

FIG. 18 is a flowchart that illustrates a main routine of the control performed in the seventh embodiment of the present disclosure. The processing of step S100 in the main routine shown in FIG. 18 is as already described in the first embodiment. In the present routine, after determining in step S100 that the internal combustion engine 10 is during the slightly stratified-charge lean-burn operation, the ECU 40 executes the processing concerning a slightly stratified-charge lean-burn control (step S1200). The slightly stratified-charge lean-burn control mentioned here corresponds to the SA-CA10 feedback control and the CA10-90 correction control that respectively include, as correction terms, learning terms ($F_{CG}$ and $F_{IG}$ described later) by the learning processing according to the present embodiment.

Figure 19:
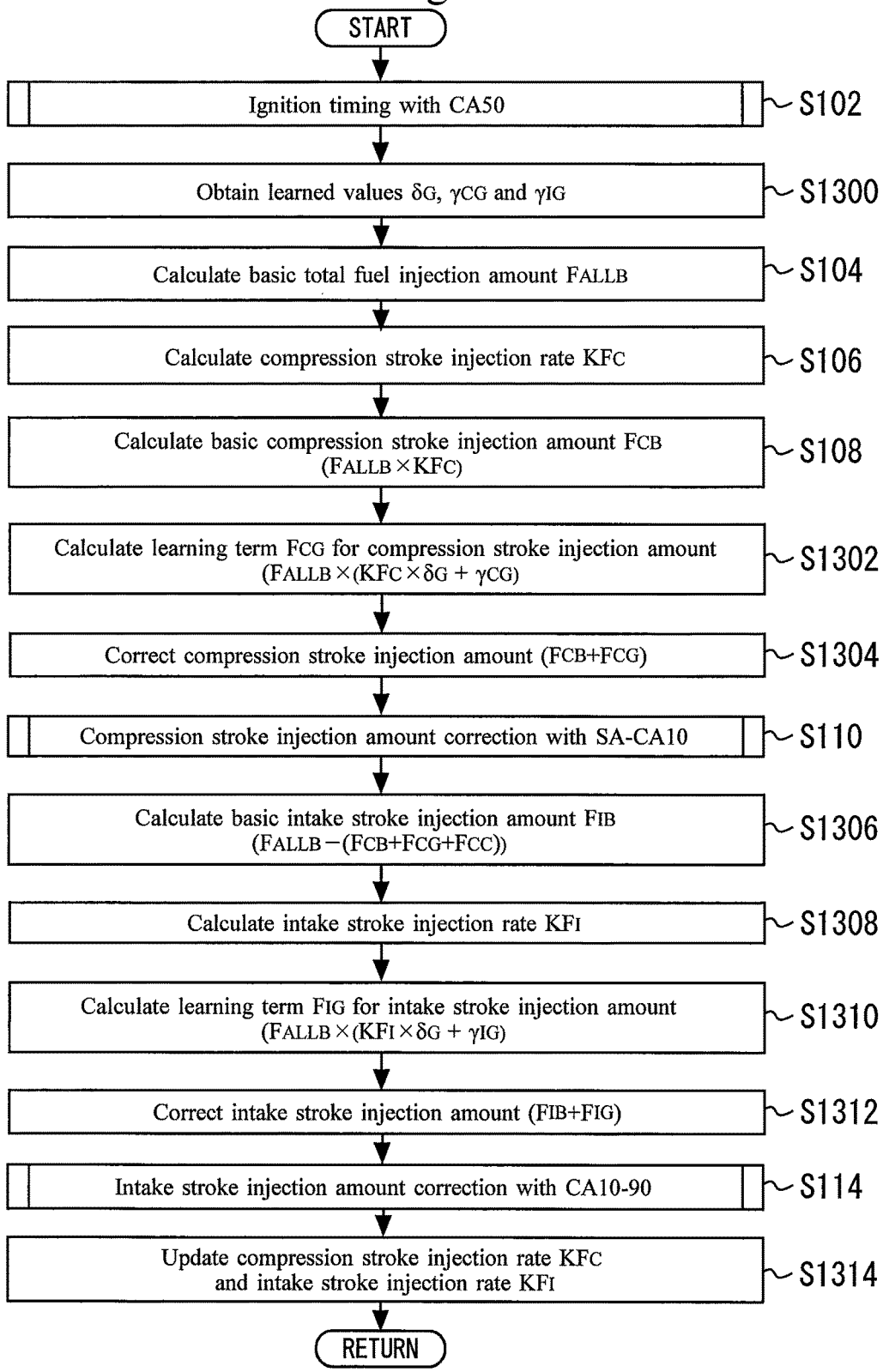
FIG. 19 is a flowchart that illustrates a subroutine of the processing concerning the slightly stratified-charge lean-burn control.

FIG. 19 is a flowchart that illustrates a subroutine of the processing concerning the slightly stratified-charge lean-burn control. The processing of steps S102 to S110 and S114 in the subroutine shown in FIG. 19 is as already described in the first embodiment. In the present routine, the ECU 40 obtains the learned values $\delta_G$, $\gamma_{CG}$ and $\gamma_{IG}$ (%) following the processing of step S102 (step S1300). To be more specific, the ECU 40 refers to the learning map shown in FIG. 17A and calculates the learned value $\delta_G$ as a value corresponding to the current intake air amount and the basic total fuel injection amount $F_{ALLB}$ that is used for the current combustion cycle, (using the interpolation or extrapolation as needed). Further, the ECU 40 refers to the learning maps shown in FIGS. 17B and 17C and calculates the learned values $\gamma_{CG}$ and $\gamma_{IG}$ as values corresponding to the current engine load factor and the current engine speed, (using the interpolation or extrapolation as needed).

Next, following the processing of steps S104 to S108, the ECU 40 calculates the learned term $F_{CG}$ for the compression stroke injection amount used for the next combustion cycle (step S1302). To be more specific, first, a sum of the learned value $\gamma_{CG}$ obtained in step S1300, and a product (namely, $\delta_{CG}$ that is a portion of the learned value $\delta_G$ concerning the compression stroke injection) of the learned value $\delta_G$ obtained in step S1300 and the compression stroke injection rate $KF_C$ is calculated as a correction rate ($KF_C \times \delta_G + \gamma_{CG}$) (%) by the learning processing. On that basis, the learned term $F_{CG}$ for the compression stroke injection is calculated by multiplying the basic total fuel injection amount $F_{ALLB}$ by the calculated correction rate ($KF_C \times \delta_G + \gamma_{CG}$).

Next, the ECU 40 corrects the compression stroke injection amount by adding the learned term $F_{CG}$ calculated in step S1302 to the basic compression stroke injection amount $F_{CB}$ (step S1304). The ECU 40 then executes the processing concerning the SA-CA10 feedback control in step S110. According to the processing of steps S1304 and S110, the target (final) compression stroke injection amount for the next combustion cycle is calculated as a value obtained by adding, to the basic compression stroke injection amount $F_{CB}$, the learned term $F_{CG}$ and the compression stroke injection correction term $F_{CC}$ (that is, a calculation value by the processing of step S214).

Next, the ECU 40 calculates the basic intake stroke injection amount $F_{IB}$ (step S1306). In step S1306, a value obtained by subtracting, from the basic total fuel injection amount $F_{ALLB}$ calculated in step S104, the final compression stroke injection amount ($F_{CB}+F_{CG}+F_{CC}$) obtained after the processing of step S1304 and S110 is calculated as the basic intake stroke injection amount $F_{IB}$.

Next, the ECU 40 calculates the intake stroke injection rate $KF_I$ (step S1308). The value obtained by dividing, by the basic total fuel injection amount $F_{ALLB}$ (refer to step S104), the final compression stroke injection amount ($F_{CB}+F_{CG}+F_{CC}$) subject to the learning processing corresponds to the compression stroke injection rate $KF_C$ subject to the learning processing. In step S1308, the intake stroke injection rate $KF_I$ is calculated by subtracting this value from 1.

Next, the ECU 40 calculates the learned term $F_{IG}$ for the intake stroke injection amount used for the next combustion cycle (step S1310). To be more specific, first, a sum of the learned value $\gamma_{IG}$ obtained in step S1300, and a product (namely, $\delta_{IG}$ that is a portion of the learned value $\delta_G$ concerning the intake stroke injection) of the learned value $\delta_G$ obtained in step S1300 and the intake stroke injection rate $KF_I$ is calculated as a correction rate ($KF_I \times \delta_G + \gamma_{IG}$) (%) by the learning processing. On that basis, the learned term $F_{IG}$ for the intake stroke injection is calculated by multiplying the basic total fuel injection amount $F_{ALLB}$ by the calculated correction rate ($KF_I \times \delta_G + \gamma_{IG}$).

Next, the ECU 40 corrects the intake stroke injection amount by adding the learned term $F_{IG}$ calculated in step S1310 to the basic intake stroke injection amount $F_{IB}$ (step S1312). The ECU 40 then executes the processing concerning the CA10-90 correction control in step S114. According to the processing of steps S1312 and S114, the target (final) intake stroke injection amount for the next combustion cycle is calculated as a value obtained by adding, to the basic intake stroke injection amount $F_{IB}$, the learned term $F_{IG}$ and the intake stroke injection correction term $F_{IC}$ (namely, a stored value which is updated last by the processing of step S314).

Next, the ECU 40 executes the processing to update the compression stroke injection rate $KF_C$ and the intake stroke injection rate $KF_I$ (step S1314). To be more specific, the compression stroke injection rate $KF_C$ is updated using the value (($F_{CB}+F_{CG}+F_{CC}$)/$F_{ALLB}$) that has been already described for the processing of step S1308, and stored in the memory 40a. Further, the intake stroke injection rate $KF_I$ is updated using the value calculated by the processing of step S1308 and stored in the memory 40a. The updated compression stroke injection rate $KF_C$ and the updated intake stroke injection rate $KF_I$ are used when the learning processing of the correction rates δ, $\gamma_C$ and $\gamma_I$ is performed at the next combustion cycle.

In the main routine shown in FIG. 18, following the processing of step S1200, the ECU 40 determines whether or not a predetermined learning execution condition for the learning processing described above is met (step S1202). The correction rate α that should be taken as learned data is a value necessary to decrease a steady deviation of the actual SA-CA10 with respect to the target SA-CA10. It is thus favorable that, in order to highly ensure the accuracy of the learning, the learning processing be executed in a condition in which the actual SA-CA10 remains stable with respect to the target SA-CA10. This also applies to a relationship between the correction rate β and the CA10-90 correction control. Accordingly, it can be determined that, for example, the learning execution condition is met when the time change rate of the engine operating condition (such as, the engine load factor and the engine speed) is lower than or equal to a predetermine value (that is, when the internal combustion engine 10 is in a steady operating state). Moreover, it can also be determined that, for example, the learning execution condition is met when a predetermined time period elapses after the target SA-CA10 is changed, or when a change rate of the correction rate α calculated by the processing of step S212 has decreased to a predetermined value or less. Furthermore, any combination of these determination manners may be used.

If the learning execution condition is met, the ECU 40 executes the learning processing of steps S1204 to S1214. In step S1204, the correction rate α calculated in step S212 is obtained for the learning processing. In step S1206, the ECU 40 obtains the correction rate β calculated by dividing, by the basic intake stroke injection amount $F_{IB}$ calculated in step S1306, the stored value of the intake stroke injection correction term $F_{IC}$ that has been update last by the processing of step S314. In step S1208, the correction rate γ (that is, a portion concerning a change of the combustion characteristics) is obtained in accordance with the current target air-fuel ratio A/Ftgt and the actual air-fuel ratio A/F detected with the air-fuel ratio sensor 34, with use of equation (11) described above.

In step S1210, the correction rate S is calculated, according to equation (14), using the correction rates α, β, γ, the compression stroke injection rate $KF_C$ and the intake stroke injection rate $KF_I$ that are respectively obtained in steps S1204, S1206, S1208, S106 and S1308, and the learning of the learning map shown in FIG. 17A (that is, the learning of the learning map concerning the deviation of the air-fuel ratio) is executed using a calculated correction rate δ as a learned data. The concrete manner of the processing to reflect the correction rate δ that is a learned data in the learning map is not particularly limited. Thus, for example, the learned value $δ_G$ may be immediately updated using an obtained learned data, or may be updated using a mean value of a predetermined number of learned data which has been compiled in a condition in which the values of axes of the map are equal. This also applies to the processing of the following steps S1212 and S1214.

In step S1212, the correction rate $γ_C$ is calculated, according to equation (15), using the correction rates α, β, γ, the compression stroke injection rate $KF_C$ and the intake stroke injection rate $KF_I$ that are respectively obtained in steps S1204, S1206, S1208, S106 and S1308, and the learning of the learning map shown in FIG. 17B (that is, the learning of the learning map concerning a change of the combustion characteristics with respect to the compression stroke injection) is executed using a calculated correction rate $γ_C$ as a learned data. In step S1214, although the contents of the processing is different from that in step S1212 in a point that equation (16) is used, the learning of the learning map for correction rate $γ_I$ shown in FIG. 17C (that is, the learning of the learning map concerning a change of the combustion characteristics with respect to the intake stroke injection) is executed using a similar processing to that of step S1212.

According to the control of the seventh embodiment described so far, the correction rate α for the SA-CA10 feedback control and the correction rate β for the CA10-90 correction control are not used, as they are, as the learned values at the time of performing the learning processing. More specifically, the correction rates α and β are divided into the three correction rates δ, $γ_C$ and $γ_I$ with consideration for both of the cause of deviation of the actual SA-CA10 with respect to the target SA-CA10 and the cause of deviation of the actual CA10-90 with respect to the tolerable CA10-90. Further, the learning processing is executed using the learning maps described above that include, as the axes thereof, a minimum number of parameters that are favorable in terms of association with the respective correction rates δ, $γ_C$ and $γ_I$.

In more detail, the correction rate δ is addressed to the errors of the intake air amount and the fuel injection amount that cause the deviation of the air-fuel ratio. Therefore, for the correction rate δ, with use of the learning map that includes the intake air amount correlation value and the fuel injection amount correlation value as the axes thereof, a continuous (consistent) tendency can be obtained with respect to a change of the learned value as a result of a change of the value of the axis of the map. Consequently, an accurate calculation can be performed in calculating a value of the map at a position other than the grid points with use of the interpolation or extrapolation.

Moreover, it can be empirically said that the tendency of portions (that is, correction rates $γ_C$ and $γ_I$) concerning the correction for a change of the combustion characteristics is easy to be obtained in a manner according to the engine operating region that is determined with the engine torque and the engine speed. One of the reasons is that the influence of a change of the combustion characteristics on the combustion is different depending on the engine operating region, and that, more specifically, the degree of the influence of a change of the combustion characteristics on the combustion in each engine operating region is different from each other due to whether or not a basic combustion in each engine operating region is good. Therefore, with respect to the learning of the correction rates $γ_C$ and $γ_I$ concerning a change of the combustion characteristics, with use of the engine torque and the engine speed as the axes of the maps as shown in FIGS. 17B and 17C, the accuracy of calculation of the learned values $γ_{CG}$ and $γ_{IG}$ can be easy to be ensured when the interpolation or the extrapolation is performed while reducing the number of axes of the maps to the minimum necessary.

As described so far, according to the learning processing of the present embodiment, the learning is performed while distributing the correction rate α according to the cause of a steady deviation of the actual SA-CA10 with respect to the target SA-CA10, and each axis of the map is properly selected as described above. The learning processing can thereby be caused to accompany the SA-CA10 feedback control in such a manner that a high learning accuracy is obtained while reducing the time required for the learning. This also applies to the CA10-90 correction control that uses the correction rate β.

Figure 20:
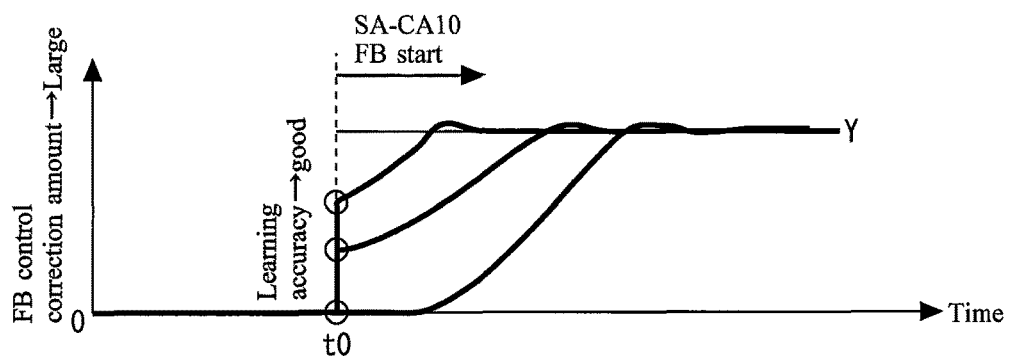
FIG. 20 is a time chart for explaining the advantageous effects obtained when the accuracy of the learning accompanying the SA-CA10 feedback control is high.

FIG. 20 is a time chart for explaining the advantageous effects obtained when the accuracy of the learning accompanying the SA-CA10 feedback control is high. A "FB control correction amount" of the vertical axis in FIG. 20 corresponds to a sum of the compression stroke injection correction term $F_{CC}$ based on the correction rate α for the SA-CA10 feedback control and the learned term $F_{CG}$. A FB correction amount Y shown in FIG. 20 indicates a value necessary to cause the actual SA-CA10 to converge with the target SA-CA10 after the start of the control. In addition, as an example of ON/OFF timings of the SA-CA10 feedback control during running of the vehicle, a timing of executing a rich spike operation for reducing exhaust gas emission, a timing of executing a fuel cut operation, a timing of executing an idling operation, or a timing of executing a high load operation can be taken. Additionally, a timing of executing a gear shifting operation of the vehicle may also be taken as the example.

As shown in FIG. 20, as the learning accuracy is higher, the difference between the FB correction amount (that is, the learned term described above) at a control start time point t0 and the FB correction amount Y becomes smaller, and the compression stroke injection correction term $F_{CC}$ calculated after the start of the feedback control thereby becomes smaller. Because of this, as the learning accuracy is higher, the time required for the convergence (that is, the response delay of the feedback control) can be reduced. Therefore, the drivability and the reduction of exhaust gas emission of the internal combustion engine 10 can be improved. To be more specific, if the actual SA-CA10 is greater than the target SA-CA10 at the control start time point t0 (that is, if the air-fuel ratio deviates to the leaner side), the drivability can be improved due to a reduction of the response delay, and, conversely, if the actual SA-CA10 is less than the target SA-CA10 at the control start time point t0 (that is, if the air-fuel ratio deviates to the richer side), the reduction of exhaust gas emission (in more detail, NOx emission) can be improved due to a reduction of the response delay. In addition, the advantageous effects described with reference to FIG. 20 are also obtained when the CA10-90 feedback control is performed to control the intake stroke injection amount on the basis of the CA10-90.

Eighth Embodiment

Next, an eighth embodiment according to the present disclosure will be described with reference to FIG. 21.
[Control According to Eighth Embodiment]

The control according to the present embodiment is different from the seventh embodiment in a manner of the learning for the correction rate S concerning the deviation of the air-fuel ratio. In an internal combustion engine in which a stoichiometric burn operation is performed in addition to the slightly stratified-charge lean-burn operation as in the internal combustion engine 10, an air-fuel ratio feedback control to correct the fuel injection amount so as to cause the actual air-fuel ratio A/F detected with the air-fuel sensor 34 to approach a target air-fuel ratio (that is, the stoichiometric air-fuel ratio) $A/F_{tgt}$ is generally performed during the stoichiometric burn operation. Also, a processing to take, as a learned value $\delta_{SG}$, a correction rate $\delta_S$ (%) to reduce a steady deviation of the actual air-fuel ratio A/F with respect to the target $A/F_{tgt}$ is performed in general during this air-fuel ratio feedback control. This correction rate $\delta_S$ corresponds to the correction rate $\delta$ calculated in the seventh embodiment.

The axes of the learning map shown in FIG. 17A are the intake air amount correlation value and the fuel injection amount correlation value. Therefore, the learned value $\delta_{SG}$ and the learned value $\delta_G$ can be compared to each other on the same evaluation basis (that is, with the aforementioned axes of the learning map) even if an area of the learning map used in the learning for the stoichiometric burn operation is different from that for the slightly stratified-charge lean-burn operation. Accordingly, in the present embodiment, the learned value $\delta_{SG}$ obtained for the air-fuel ratio feedback control is converted to the learning for the correction rate $\delta$ performed at the time of the slightly stratified-charge lean-burn operation. That is, in the present embodiment, the learning with the learning map shown in FIG. 17A is performed during the stoichiometric burn operation.
(Concrete Processing According to Eighth Embodiment)

Figure 21:
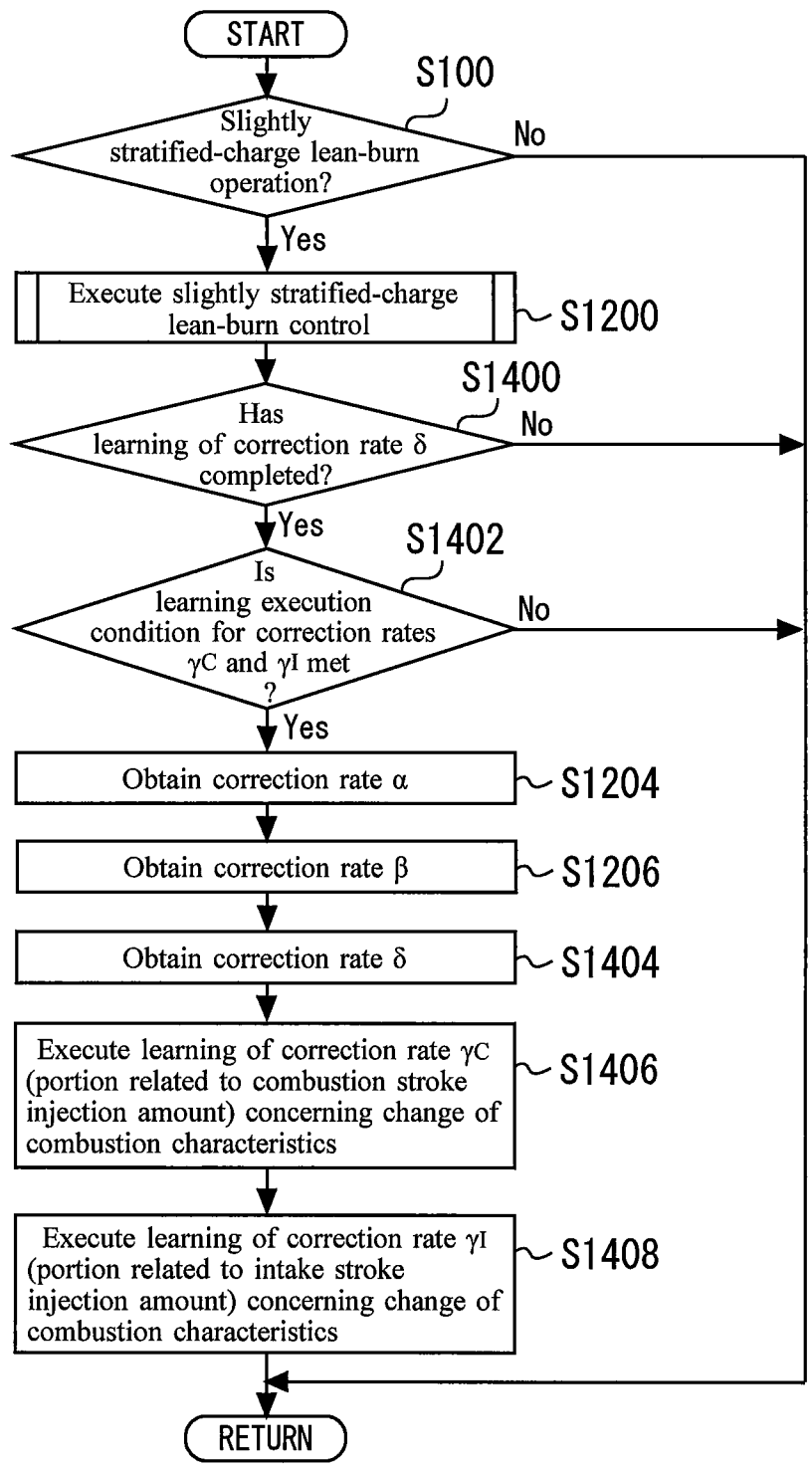
FIG. 21 is a flowchart that illustrates a main routine of the control performed in an eighth embodiment of the present disclosure.

FIG. 21 is a flowchart that illustrates a main routine of the control performed in the eighth embodiment of the present disclosure. The processing of steps S100, S1200, S1204 and S1206 in the main routine shown in FIG. 21 is as already described in the seventh embodiment. In the present routine, after executing the processing concerning the slightly stratified-charge lean-burn control, the ECU 40 determines whether or not the learning for the correction rate $\delta$ performed at the time of the stoichiometric burn operation (that is, the learning for the correction rate Ss in the air-fuel ratio feedback control) has completed (step S1400).

If the learning for the correction rate $\delta$ has completed, the ECU 40 then determines whether or not the learning execution condition for the remaining correction rates $\gamma_C$ and $\gamma_I$ is met (step S1402). This determination can be performed using a similar manner to that for step S1202.

If the determination result of step S1402 is positive, the ECU 40 executes the processing of steps S1204, S1206 and S1404 to S1408 concerning the learning of the correction rates $\gamma_C$ and $\gamma_I$. To be more specific, following the processing of step S1206, the ECU 40 obtains the correction rate $\delta$ used to calculate the learned data for the correction rates $\gamma_C$ and $\gamma_I$ (step S1404). In step S1404, with reference to the learning map for the correction rate $\delta$ for which the learning is performed at the time of the stoichiometric burn operation, the learned value $\delta_{SG}$ corresponding to the intake air amount and the total fuel injection amount $F_{ALL}$ that are obtained when the correction rates $\alpha$ and $\beta$ obtained in steps S1204 and S1206 are calculated is obtained as the correction rate $\delta$ in this step S1404. In addition, the operating region in which the stoichiometric burn operation is performed is basically different from the operating region in which the slightly stratified-charge lean-burn operation is performed. Therefore, an area in the learning map in which the learned value $\delta_G$ ($\delta_{SG}$) obtained at the time of the stoichiometric burn operation is stored is often different from an area used if an identical learning is performed at the time of the slightly stratified-charge lean-burn operation. However, with use of the extrapolation, the learned value $\delta_{SG}$ of the correction rate $\delta$ according to the current value of the axis of the map can be obtained at the time of the slightly stratified-charge lean-burn operation.

Next, the ECU 40 executes the learning of the learning map shown in FIG. 17B (that is, the learning of the learning map related to a change of the combustion characteristics concerning the compression stroke injection) (step S1406). The processing of this step S1406 is different from the processing of step S1212 according to the seventh embodiment in a manner of calculation of the correction rate $\gamma_C$ used in this learning. In more detail, in the present routine, since the correction rate $\delta$ is obtained by the processing of step S1404, the correction rate $\gamma_C$ is calculated as a learned data with use of an equation that includes, as terms, the correction rates $\alpha$ and $\beta$ and the compression stroke injection rate $KF_C$ in equation (15).

Next, the ECU 40 executes the learning of the learning map shown in FIG. 17C (that is, the learning of the learning map related to a change of the combustion characteristics concerning the intake stroke injection) (step S1408). In this step S1408, based on an identical manner with the processing of step S1406, the correction rate $\gamma_I$ is calculated as a learned data with use of an equation that includes, as terms, the correction rates $\beta$ and $\delta$ and the intake stroke injection rate KM in equation (16).

Moreover, in the present embodiment, the acquisition of the learned value $\delta_G$ of the correction rate $\delta$ in step S1300 of the subroutine shown in FIG. 19 is executed as follows. That is, with reference to the learning map for the correction rate $\delta$ for which the learning is performed at the time of the stoichiometric burn operation, the learned value $\delta_G$ corresponding to the current intake air amount and the basic total fuel injection amount $F_{ALLB}$ used at the current combustion cycle is obtained.

In the eighth embodiment described above, the learned value $\delta_{SG}$ obtained for the air-fuel ratio feedback control at the time of the stoichiometric burn operation is converted to the learning for the correction rate δ performed at the time of the slightly stratified-charge lean-burn operation. Alternatively, the manners of the learning for the correction rate δ that are used in the seventh and eighth embodiments may be combined, and the learning for the correction rate δ may be performed in both of the slightly stratified-charge lean-burn operation and the stoichiometric burn operation. In addition, even if a configuration is made such that, although the air-fuel ratio feedback control described above is executed at the time of the stoichiometric burn operation, the learning processing described above is not performed for this feedback control, an identical learning processing may be performed at the time of the stoichiometric burn operation so that the results of this learning processing are used in the control performed at the time of the slightly stratified-charge lean-burn operation.

[Ignition Delay Index Value and Specified Combustion Index Value]

In the first to eighth embodiments, the SA-CA10 is taken as an example of the "ignition delay index value" that represents the ignition delay. However, as an alternative to the SA-CA10, any desired crank angle interval from the spark timing (SA) to an arbitrary specified ratio combustion point CAX1 other than CA10 instead of the SA-CA10 may be, for example, used as the "ignition delay index value" according to the present disclosure, as far as it is a parameter that includes the ignition delay period (that is, a crank angle interval from the spark timing to a crank angle timing at which heat release starts (that is, the combustion start point CA0)).

Moreover, in the first to eighth embodiments described above, the CA10-90 is taken as an example of the "specified combustion index value" that represents the main combustion speed. However, as an alternative to the CA10-90, a crank angle interval determined by any desired two crank angle points CAX2 and CAX3 included in a crank angle interval from CA0 to CA100 (that is, a combustion end point) may be used as the "specified combustion index value" that represents the main combustion speed. Further, the "specified combustion index value" that represents the main combustion speed may be a maximum value of a heat release rate $dQ/d\theta$ ($\theta$ denotes a crank angle), or a value of the heat release rate $dQ/d\theta$ at a certain combustion point (for example, the combustion center (CA50)). Moreover, instead of the heat release rate $dQ/d\theta$, the "specified combustion index value" that represents the main combustion speed may be a maximum value of a $dQ/dt$ or a value of the heat release rate $dQ/dt$ at a certain combustion point (for example, the combustion center (CA50)) (t denotes a time). Furthermore, the "specified combustion index value" according to the present disclosure may be a parameter that represents a combustion fluctuation rate instead of a parameter that represents the main combustion speed. In general, a fluctuation rate (%) of a certain parameter can be represented by a value that is obtained by multiplying, by 100, a value obtained by dividing a standard deviation by a mean value. The parameter that represents the combustion fluctuation rata may be a fluctuation rate of each parameter described above that represents the main combustion speed, or may be a fluctuation rate of either an indicated mean effective pressure, an indicated torque or the combustion center (CA50).

The embodiments and various modifications described above may be appropriately combined in various ways other than those explicitly shown, and may be modified in various ways without departing from the gist of the present disclosure.

What is claimed is:

1. A control apparatus for an internal combustion engine that includes:
   an ignition device configured to ignite an air-fuel mixture in a cylinder;
   a fuel injection device that includes at least an in-cylinder injection valve configured to directly inject fuel into the cylinder; and
   an in-cylinder pressure sensor configured to detect in-cylinder pressure,
   wherein the control apparatus is configured to cause the fuel injection device to execute a main injection of fuel in or before an intake stroke and a compression stroke injection of the fuel in a compression stroke to perform a slightly stratified-charge lean-burn operation with a lean air-fuel ratio leaner than a stoichiometric air-fuel ratio, and
   wherein the control apparatus is configured, during the slightly stratified-charge lean-burn operation, to:
   (a) calculate, based on a required torque of the internal combustion engine, a basic total fuel injection amount that should be supplied in a cylinder during one combustion cycle;
   (b) calculate, based on an ignition delay index value, a compression stroke injection amount by the compression stroke injection;
   (c) calculate, as a basic main injection amount of the main injection, a value obtained by subtracting the compression stroke injection amount from the basic total fuel injection amount;
   (d) calculate, based on an output value of the in-cylinder pressure sensor, an actual specified combustion index value of a specified combustion index value that represents a main combustion speed or a combustion fluctuation rate;
   (e) calculate a main injection correction term based on a result of a comparison between a target specified combustion index value or a tolerable specified combustion index value, and the actual specified combustion index value; and
   (f) calculate a main injection amount by the main injection by adding the main injection correction term to the basic main injection amount.

2. The control apparatus according to claim 1,
   wherein the control apparatus is configured to:
   (g) calculate the main injection correction term based on a result of a comparison between the tolerable specified combustion index value and the actual specified combustion index value; and
   (h) calculate, as the main injection correction term, a value for increasing the main injection amount when a main combustion speed represented by the actual specified combustion index value is lower than a main combustion speed represented by the tolerable specified combustion index value or when a combustion fluctuation rate represented by the actual specified combustion index value is higher than a combustion fluctuation rate represented by the tolerable specified combustion index value.

3. The control apparatus according to claim 1,
   wherein the control apparatus is configured to:
   (i) calculates the main injection correction term based on a result of a comparison between the target specified combustion index value and the actual specified combustion index value; and
   (j) correct the main injection amount by adding, to the basic main injection amount, the main injection correction term for causing the actual specified combustion index value to approach the target specified combustion index value.

4. The control apparatus according to claim 1, wherein the control apparatus is configured to:
(k) calculate, based on a target ignition delay index value, a basic compression stroke injection amount of the compression stroke injection;
(l) calculate an actual ignition delay index value based on an output value of the in-cylinder pressure sensor; and
(m) calculate a compression injection correction term for causing the actual ignition delay index value to approach the target ignition delay index value and correct the compression stroke injection amount by adding the compression stroke injection correction term to the basic compression stroke injection amount.

5. The control apparatus according to claim 1, wherein the control apparatus is configured to:
(i) calculates the main injection correction term based on a result of a comparison between the target specified combustion index value and the actual specified combustion index value;
(j) correct the main injection amount by adding, to the basic main injection amount, the main injection correction term for causing the actual specified combustion index value to approach the target specified combustion index value;
(k) calculate, based on a target ignition delay index value, a basic compression stroke injection amount of the compression stroke injection;
(l) calculate an actual ignition delay index value based on an output value of the in-cylinder pressure sensor;
(m) calculate a compression injection correction term for causing the actual ignition delay index value to approach the target ignition delay index value and correct the compression stroke injection amount by adding the compression stroke injection correction term to the basic compression stroke injection amount; and
(n) increase a response speed of adjustment of the basic compression stroke injection amount with the compression stroke injection correction term compared to a response speed of adjustment of the basic main injection amount with the main injection correction term.

6. The control apparatus according to claim 4, wherein the control apparatus is configured, if a plurality of compression stroke injections is executed during one combustion cycle, to apply the compression stroke injection correction term to a compression stroke injection executed at a most retard position.

7. The control apparatus according to claim 4, wherein the control apparatus is configured, at a time of a transitional operation of the internal combustion engine, to correct the compression stroke injection amount by adding, to the basic compression stroke injection amount, a compression stroke injection increment value based on an engine load factor and a time change rate of the engine load factor instead of correcting the basic compression stroke injection amount with the compression stroke injection correction term.

8. The control apparatus according to claim 4, wherein the internal combustion engine further includes an air-fuel ratio sensor configured to detect an actual air-fuel ratio, and
wherein where a correction rate $\alpha$ denotes a ratio of the compression stroke injection correction term to the basic compression stroke injection amount, a correction rate $\beta$ denotes a ratio of the main injection correction term to the basic main injection amount, a correction rate $\gamma$ denotes a ratio of a difference that is obtained by subtracting the actual air-fuel ratio from a target air-fuel ratio to the basic main injection amount, a compression stroke injection rate $KF_C$ denotes a ratio of the basic compression stroke injection amount to the basic total fuel injection amount, a main injection rate $KF_I$ denotes a ratio of the basic main injection amount to the basic total fuel injection amount, and a correction rate $\delta$, a correction rate $\gamma_C$ concerning the compression stroke injection and a correction rate $\gamma_I$ concerning the intake stroke injection respectively denote a calculation value $(KF_C \times \alpha + KF_I \times (\beta - \gamma))$, a calculation value $(KF_C \times (KF_I \times (\alpha - \beta) + \gamma))$ and a calculation value $(KF_I \times (KF_C \times (\gamma - \alpha) + \gamma))$ that are based on the correction rates $\alpha$, $\beta$, and $\gamma$, the compression stroke injection rate $KF_C$ and the main injection rate $KF_I$, the control apparatus is configured to:
(o) learn a $\delta$-learning map in which learned values $\delta_G$ of the correction rate $\delta$ are associated with a fuel injection amount correlation value and an intake air flow rate correlation value;
(p) learn a $\gamma_C$-learning map in which learned values $\gamma_{CG}$ of the correction rate $\gamma_C$ concerning the compression stroke injection are associated with an engine torque correlation value and an engine speed correlation value;
(q) learn a $\gamma_I$-learning map in which learned values $\gamma_{IG}$ of the correction rate $\gamma_I$ concerning the intake stroke injection are associated with the engine torque correlation value and the engine speed correlation value;
(r) calculate a learning term of the compression stroke injection amount by multiplying the basic total fuel injection amount by a sum of the learned values $\gamma_{CG}$ and a calculation value $(KF_C \times \delta_G)$ that is a product of the compression stroke injection rate $KF_C$ and the learned values $\delta_G$, and correct the compression stroke injection amount by adding a calculated learning term of the compression stroke injection amount to the basic compression stroke injection amount; and
(s) calculate a learning term of the main injection amount by multiplying the basic total fuel injection amount by a sum of the learned values $\gamma_{IG}$ and a calculation value $(KF_I \times \delta_G)$ that is a product of the main injection rate $KF_I$ and the learned values $\delta_G$, and correct the main injection amount by adding a calculated learning term of the main injection amount to the basic main injection amount.

9. The control apparatus according to claim 1, wherein the control apparatus is configured, if a plurality of main injections is executed during one combustion cycle, to apply the main injection correction term to a main injection executed at a most advance position.

* * * * *